US012662559B2

(12) United States Patent
Shimoju et al.

(10) Patent No.: US 12,662,559 B2
(45) Date of Patent: Jun. 23, 2026

(54) CURABLE COMPOSITION FOR IMPRINTING, CURED SUBSTANCE, IMPRINT PATTERN PRODUCING METHOD, AND METHOD FOR MANUFACTURING DEVICE

(71) Applicant: FUJIFILM Corporation, Tokyo (JP)

(72) Inventors: Naoya Shimoju, Haibara-gun (JP); Akinori Shibuya, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 18/450,039

(22) Filed: Aug. 15, 2023

(65) Prior Publication Data

US 2023/0383027 A1 Nov. 30, 2023

Related U.S. Application Data

(63) Continuation of application No. PCT/JP2022/005427, filed on Feb. 10, 2022.

(30) Foreign Application Priority Data

Feb. 16, 2021 (JP) ................................ 2021-022605

(51) Int. Cl.

| | |
|---|---|
| ***C08F 2/46*** | (2006.01) |
| ***B29C 59/02*** | (2006.01) |
| ***C08F 2/50*** | (2006.01) |
| ***C08F 22/14*** | (2006.01) |
| ***C08G 61/04*** | (2006.01) |
| *B29K 67/00* | (2006.01) |

(52) U.S. Cl.

CPC .............. *C08F 22/14* (2013.01); *B29C 59/02* (2013.01); *B29K 2067/04* (2013.01)

(58) Field of Classification Search

CPC ........ C08F 222/1025; C08F 2/50; C08F 2/44; C08F 22/14; B29K 2067/04; B29C 59/02; H01L 21/027

USPC ................. 522/64, 6, 189, 184, 71, 1; 520/1

See application file for complete search history.

(56) References Cited

U.S. PATENT DOCUMENTS

| | | | |
|---|---|---|---|
| 8,540,888 | B1 | 9/2013 | Yang et al. |
| 2011/0065824 | A1 | 3/2011 | Fujita et al. |
| 2016/0215074 | A1 | 7/2016 | Honma et al. |
| 2017/0285465 | A1 | 10/2017 | Iimura et al. |
| 2021/0388134 | A1 | 12/2021 | Shimoju et al. |
| 2022/0009153 | A1 | 1/2022 | Goto et al. |

FOREIGN PATENT DOCUMENTS

| | | | | |
|---|---|---|---|---|
| JP | 2008-105414 A | 5/2008 | | |
| JP | 2010-114209 A | 5/2010 | | |
| JP | 2011-066074 A | 3/2011 | | |
| JP | 2013-245229 A | 12/2013 | | |
| JP | 6080813 B2 | 2/2017 | | |
| JP | 2020-204757 A | 12/2020 | | |
| TW | 202043310 A | 12/2020 | | |
| WO | 2017/170697 A1 | 10/2017 | | |
| WO | WO-2020175301 A1 * | 9/2020 | ............... | C09D 4/00 |
| WO | 2020/203386 A1 | 10/2020 | | |

OTHER PUBLICATIONS

Akinori et al, WO 2020175301 Machine Translation, Sep. 3, 2020 (Year: 2020).*

Office Action dated Jul. 15, 2025, issued in Japanese application No. 2023-500805.

Office Action issued Mar. 27, 2025 in Taiwanese Application No. 111104977.

International Search Report issued Mar. 22, 2022 in International Application No. PCT/JP2022/005427.

Written Opinion issued Mar. 22, 2022 in International Application No. PCT/JP2022/005427.

International Preliminary Report on Patentability dated Aug. 22, 2023 with a Translation of the Written Opinion of the International Searching Authority in Application No. PCT/JP2022/005427.

Office Action issued Oct. 28, 2025 in Japanese Application No. 2023-500805.

Communication dated Mar. 24, 2026 in Japanese Application No. 2023-500805.

* cited by examiner

*Primary Examiner* — Jessica Whiteley

(74) *Attorney, Agent, or Firm* — Sughrue Mion, PLLC

(57) ABSTRACT

Provided are a curable composition for imprinting, which contains a polymerizable compound and a polymerization initiator, in which one of components contained in the composition is a compound which includes a 5-membered ring structure having two or more heteroatoms as ring members; a cured substance of the curable composition for imprinting; an imprint pattern producing method using the curable composition for imprinting; and a method for manufacturing a device, which includes the imprint pattern producing method.

12 Claims, No Drawings

CURABLE COMPOSITION FOR IMPRINTING, CURED SUBSTANCE, IMPRINT PATTERN PRODUCING METHOD, AND METHOD FOR MANUFACTURING DEVICE

CROSS-REFERENCE TO RELATED APPLICATIONS

This application is a Continuation of PCT International Application No. PCT/JP2022/005427 filed on Feb. 10, 2022, which claims priority under 35 U.S.C. § 119(a) to Japanese Patent Application No. 2021-022605 filed on Feb. 16, 2021. Each of the above application(s) is hereby expressly incorporated by reference, in its entirety, into the present application.

BACKGROUND OF THE INVENTION

1. Field of the Invention

The present invention relates to a curable composition for imprinting, a cured substance, an imprint pattern producing method, and a method for manufacturing a device.

2. Description of the Related Art

An imprinting method is a technique in which a fine pattern is transferred to a material by pressing a metal mold (generally also called a mold or a stamper) on which a pattern is formed. The imprinting method enables simple and precise production of a fine pattern, and thus is expected to be applied in various fields, such as a precision processing field for semiconductor integrated circuits, in recent years. In particular, a nanoimprint technique for forming a fine pattern of a nano-order level is attracting attention.

JP2011-066074A discloses a curable composition for imprinting, which contains (A) an oxime ester compound and (B) a polymerizable monomer, in which 80% by weight or more of components of the composition, excluding a solvent, is the polymerizable monomer (B).

JP6080813B discloses a composition for optical imprinting, which contains at least a component (A) which is a polymerizable compound and a component (B) which is a photopolymerization initiator, in which the following expressions (1) and (2) are satisfied.

$$0.800 \leq Er10/Er200 \quad (1)$$

$$2.55 \ GPa \leq Er10 \quad (2)$$

(in the expressions (1) and (2), Er10 represents a composite elastic modulus (GPa) of a photocured film obtained by exposing the above-described composition for optical imprinting at an exposure amount of 10 $mJ/cm^2$, and Er200 represents a composite elastic modulus (GPa) of a photocured film obtained by exposing the above-described composition for optical imprinting at an exposure amount of 200 $mJ/cm^2$)

SUMMARY OF THE INVENTION

As the imprinting method, methods called a thermal imprinting method and a curable imprinting method have been proposed depending on a transfer method. In the thermal imprinting method, a mold is pressed against a thermoplastic resin heated to a temperature equal to or higher than a glass transition temperature (hereinafter, referred to as a "Tg" in some cases), the thermoplastic resin is cooled, and then the mold is released to form a fine pattern. In this method, various materials can be selected, but there are problems in that it is difficult to form a fine pattern, such as the need for high pressure during pressing and the deterioration of dimensional accuracy due to heat contraction.

On the other hand, in the curable imprinting method, for example, a curable film formed of the curable composition for imprinting is photocured or thermally cured while the mold is pressed against the curable film, and then the mold is released. Since it is imprinted on an uncured substance, it is possible to omit part or all of high-pressure addition and high-temperature heating, and it is possible to easily produce a fine pattern. Moreover, since a dimensional change before and after curing is small, there is also an advantage that a fine pattern can be formed with high accuracy.

Recently, new developments such as a nanocasting method in which the advantages of both the thermal imprinting method and the curable imprinting method are combined, and a reversal imprinting method for producing a three-dimensional laminated structure have also been reported.

In the curable imprinting method, a curable composition for imprinting is applied onto a support (which is subjected to an adhesion treatment as necessary), dried as necessary to form a curable film, and then pressed against a mold made of a light-transmitting material such as quartz. The curable composition for imprinting is cured by light irradiation, heating, or the like in a state where the mold is pressed, and then the mold is released to produce a cured substance to which a desired pattern is transferred.

Examples of a method of applying the curable composition for imprinting onto the support include a spin coating method and an ink jet method.

In addition, a method of performing nanofabrication using a transferred imprint pattern as a mask is called nanoimprint lithography (NIL), and has been developed as a next-generation lithography technology to replace the current ArF liquid immersion process. Therefore, same as EUV resist, the curable composition for imprinting used in NIL is required to be capable of resolving an ultrafine pattern of 20 nm or lower and to have high etching resistance as a mask for nanofabrication of an object to be processed. Specific examples of the curable composition for imprinting, which is intended to be used as the mask, include JP5426814A, JP2015-009171A, JP2015-185798A, JP2015-070145A, and JP2015-128134A.

In the imprinting method, from the viewpoint of manufacturing cost of semiconductor products, it is preferable to use the mold repeatedly without washing, exchanging, and the like the mold as much as possible.

In the present invention, in a case where the number of times the mold can be repeatedly used is large with a certain curable composition for imprinting, it is referred to that the composition is excellent in repetitive imprint suitability.

An object of the present invention is to provide a curable composition for imprinting, which is excellent in repetitive imprint suitability, a cured substance of the curable composition for imprinting, an imprint pattern producing method using the curable composition for imprinting, and a method for manufacturing a device, including the imprint pattern producing method.

Typical embodiments of the present invention are shown below.

<1> A curable composition for imprinting, comprising:

a polymerizable compound; and a polymerization initiator, in which one of components contained in the composition is a compound which includes a 5-membered ring structure having two or more heteroatoms as ring members.

<2> The curable composition for imprinting according to <1>, in which the 5-membered ring structure includes —O—, —$NR^N$—, or —N= as a ring member, and $R^N$ is a hydrogen atom or an organic group.

<3> The curable composition for imprinting according to <1> or <2>, in which all carbon atoms included in the 5-membered ring structure as ring members are $sp^2$ carbon atoms.

<4> The curable composition for imprinting according to any one of <1> to <3>, in which the 5-membered ring structure further includes, as a ring member, a carbon atom in at least one structure selected from the group consisting of —C(=O)—, —C(=S)—, —C(=$NR^N$)—, and —C($R^N$)=N—, and $R^N$ represents a hydrogen atom or an organic group.

<5> The curable composition for imprinting according to any one of <1> to <4>, in which the 5-membered ring structure further includes, as a ring member, a carbon atom in a structure represented by —C(=$CR^1R^2$)—, and $R^1$ and $R^2$ each independently represent a hydrogen atom or an organic group.

<6> The curable composition for imprinting according to any one of <1> to <5>, in which the compound which includes a 5-membered ring structure having two or more heteroatoms as ring members is a compound having an aromatic organic group.

<7> The curable composition for imprinting according to any one of <1> to <6>, in which the compound which includes a 5-membered ring structure having two or more heteroatoms as ring members is a compound represented by Formula (1), (1)

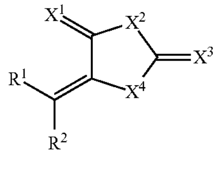

in Formula (1), $X^1$ to $X^4$ each independently represent O, S, or $NR^N$, $R^N$ represents a hydrogen atom or an organic group, and $R^1$ and $R^2$ each independently represent a hydrogen atom or an organic group, where $R^1$ and $R^2$ may be bonded to each other to form a ring.

<8> The curable composition for imprinting according to <7>, in which, in Formula (1), $X^1$ is O and $X^2$ is $NR^N$.

<9> The curable composition for imprinting according to <7> or <8>, in which at least one of $R^1$ or $R^2$ in Formula (1) is an aromatic organic group.

<10> The curable composition for imprinting according to any one of <7> to <9>, in which the compound which includes a 5-membered ring structure having two or more heteroatoms as ring members is a compound represented by Formula (2), (2)

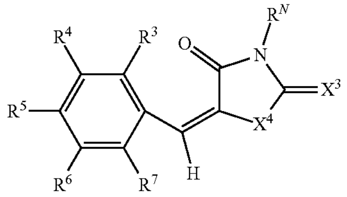

in Formula (2), $X^3$ and $X^4$ each independently represent O, S, or $NR^N$, $R^N$ represents a hydrogen atom or an organic group, and $R^3$ to $R^7$ each independently represent a hydrogen atom or an organic group, where $R^3$ to $R^7$ may be bonded to each other to form a ring.

<11> The curable composition for imprinting according to any one of <1> to <10>, in which the polymerization initiator is a polymerization initiator having an acylphosphine oxide group in a molecule.

<12> The curable composition for imprinting according to any one of <1> to <11>, further comprising:

a mold release agent.

<13> A cured substance obtained by curing the curable composition for imprinting according to any one of <1> to <12>.

<14> An imprint pattern producing method comprising:

an applying step of applying the curable composition for imprinting according to any one of <1> to <12> onto a member to be applied, which is selected from the group consisting of a support and a mold;

a contact step of contacting a member which is not selected as the member to be applied from the group consisting of the support and the mold with the curable composition for imprinting as a contact member;

a curing step of forming the curable composition for imprinting into a cured substance; and a peeling step of peeling off the mold from the cured substance.

<15> The imprint pattern producing method according to <14>, in which the support is a member including a closely adhesive layer on a surface on a side to which the curable composition for imprinting is applied.

<16> A method for manufacturing a device, comprising:

the imprint pattern producing method according to <14> or <15>.

According to the present invention, there are provided a curable composition for imprinting, which is excellent in repetitive imprint suitability, a cured substance of the curable composition for imprinting, an imprint pattern producing method using the curable composition for imprinting, and a method for manufacturing a device, including the imprint pattern producing method.

DESCRIPTION OF THE PREFERRED EMBODIMENTS

Hereinafter, representative embodiments of the present invention will be described. Respective constituent elements will be described based on the representative embodiments for convenience, but the present invention is not limited to such embodiments.

In the present specification, a numerical range expressed using the term "to" means a range which includes the preceding and succeeding numerical values of "to" as a lower limit value and an upper limit value, respectively.

In the present specification, the term "step" is meant to include not only an independent step, but also a step which cannot be clearly distinguished from other steps as long as an intended action of the step can be achieved.

In the present specification, with regard to a group (atomic group), in a case where the group (atomic group) is described without specifying whether the group (atomic group) is substituted or unsubstituted, the description means that the group (atomic group) includes both a group (atomic group) having no substituent and a group having a substituent. For example, in a case where a group is simply described as an "alkyl group", the description means that the alkyl group includes both an alkyl group having no substituent (unsubstituted alkyl group) and an alkyl group having a substituent (substituted alkyl group).

In the present specification, unless otherwise specified, "exposure" is meant to include not only drawing using light but also drawing using particle rays such as electron beams and ion beams. Examples of energy rays used for the drawing include actinic rays such as a bright line spectrum of a mercury lamp, far ultraviolet rays typified by an excimer laser, extreme ultraviolet rays (EUV light), and X-rays, and particle rays such as electron beams and ion beams.

In the present specification, "(meth)acrylate" means both "acrylate" and "methacrylate" or either of them, "(meth) acryl" means both "acryl" and "methacryl" or either of them, and "(meth)acryloyl" means both "acryloyl" and "methacryloyl" or either of them.

In the present specification, a solid content in a composition means components other than a solvent, and a content (concentration) of the solid content in the composition is represented by the mass percentage of the components other than the solvent with respect to the total mass of the composition, unless otherwise specified.

In the present specification, a temperature is 23° C., an atmospheric pressure is 101,325 Pa (1 atm), and a relative humidity is 50% RH, unless otherwise specified.

In the present specification, a weight-average molecular weight (Mw) and a number-average molecular weight (Mn) are each expressed as a value in terms of polystyrene according to gel permeation chromatography (GPC measurement), unless otherwise specified.

The weight-average molecular weight (Mw) and the number-average molecular weight (Mn) can be determined, for example, by using HLC-8220 (manufactured by TOSOH CORPORATION), and, as columns, GUARD COLUMN HZ-L, TSKgel Super HZM-M, TSKgel Super HZ4000, TSKgel Super HZ3000, and TSKgel Super HZ2000 (manufactured by TOSOH CORPORATION). Moreover, the measurement is performed using tetrahydrofuran (THF) as an eluent, unless otherwise specified. Furthermore, for the detection in the GPC measurement, a detector of ultraviolet rays (UV rays) having a wavelength of 254 nm is used, unless otherwise specified.

In the present specification, regarding a positional relationship of respective layers constituting a laminate, in a case where there is a description of "upper" or "lower", another layer may be on an upper side or a lower side of a reference layer among a plurality of layers of interest. That is, a third layer or element may be further interposed between the reference layer and the other layer, and the reference layer and the other layer are not necessary to be in contact with each other. Moreover, unless otherwise specified, in a case where a direction in which layers are stacked on a support is referred to as "upward" or there is a photosensitive layer, a direction from the support to the photosensitive layer is referred to as "upward", and the opposite direction is referred to as "downward". Furthermore, such setting of upward and downward directions is for convenience in the present specification, and in a practical aspect, the "upward" direction in the present specification may be different from a vertically upward direction.

In the present specification, "imprint" preferably refers to transfer of a pattern with a size of 1 nm to 10 mm, and more preferably refers to transfer (nanoimprint) of a pattern with a size of about 10 nm to 100 m.

(Curable Composition for Imprinting)

The curable composition for imprinting according to the embodiment of the present invention is a compound containing a polymerizable compound and a polymerization initiator, in which one of components contained in the composition is a compound which includes a 5-membered ring structure having two or more heteroatoms as ring members.

Hereinafter, the compound which includes a 5-membered ring structure having two or more heteroatoms as ring members is referred to as "specific compound".

The curable composition for imprinting according to the embodiment of the present invention is excellent in repetitive imprint suitability.

The mechanism for obtaining the above-described effect is not clear, but is presumed as follows.

In the related art, in the above-described curable imprinting method or the like, various studies have been made on a curable composition for imprinting, containing a polymerizable compound and a polymerization initiator.

As a result of intensive studies, the present inventors have found that a curable composition for imprinting, containing a compound (specific compound) which includes a 5-membered ring structure having two or more heteroatoms as ring members, is excellent in repetitive imprint suitability.

It is presumed that this is because high-density heteroatoms included in the 5-membered ring of the specific compound interact with a substrate (support) or a closely adhesive layer to improve adhesiveness between the curable composition for imprinting and the base material. Specifically, it is presumed that the improved adhesiveness suppresses clogging of a mold due to peeling of the curable composition for imprinting in a case where the mold is released from the curable composition for imprinting, and as a result, the repetitive imprint suitability is excellent. It is considered that, as a pattern formed on the mold is finer, the curable composition for imprinting is more easily peeled off and the mold is more easily clogged. Therefore, the effect of the curable composition for imprinting according to the embodiment of the present invention is particularly remarkable in a case where a fine pattern is formed on the mold.

In addition, according to the present invention, it is presumed that roughness (line width roughness) of an imprint pattern obtained after curing is suppressed. It is presumed that this is because, by containing the specific compound, polymerization is promoted during curing the pattern (for example, during exposure or during heating) and an unpolymerized portion is reduced, so that a surface of the pattern is less likely to be rough and bending of the pattern itself is also suppressed.

Furthermore, according to the present invention, it is presumed that robustness (tolerance) with respect to an exposure amount in exposure by an optical imprinting method is also increased. It is presumed that this is because the specific compound promotes the polymerization of the polymerizable compound during exposure.

Hereinafter, the curable composition for imprinting according to the embodiment of the present invention will be described in detail.

<Specific Compound>

The curable composition for imprinting according to the embodiment of the present invention contains a compound which includes a 5-membered ring structure having two or more heteroatoms as ring members.

It is sufficient that the specific compound is any one of components contained in the curable composition for imprinting according to the embodiment of the present invention, the specific compound may be a compound corresponding to either the above-described polymerizable compound or the above-described polymerization initiator, or may be a component which does not correspond to any of the above-described polymerizable compound or the above-described polymerization initiator.

In the present invention, an aspect in which the specific compound is a compound which does not correspond to any of the above-described polymerizable compound or the above-described polymerization initiator is also one of preferred aspects of the present invention.

[5-Membered Ring Structure]

The 5-membered ring structure in the specific compound may be an aromatic ring structure or an aliphatic ring structure.

Here, an aspect in which the above-described 5-membered ring structure is an aliphatic ring structure is also one of preferred aspects of the present invention.

In addition, the 5-membered ring structure in the specific compound may form a polycyclic structure with another ring structure. Examples of the polycyclic structure include a fused ring structure.

The above-described 5-membered ring structure can form a fused ring structure with another 5-membered ring structure or 6-membered ring structure, and preferred examples thereof include an aspect in which the above-described 5-membered ring structure and a benzene ring form a fused ring structure.

In addition, the specific compound may have only one of the above-described 5-membered ring structure, or may have two or more thereof. In a case of having two or more of the above-described 5-membered ring structures, structures of the respective 5-membered ring structures may be the same or different from each other.

In the present invention, an aspect in which the specific compound has only one of the above-described 5-membered ring structure is also one of preferred aspects of the present invention.

Examples of the heteroatom in the above-described 5-membered ring structure include an oxygen atom, a nitrogen atom, a sulfur atom, and a selenium atom, and from the viewpoint of repetitive imprint suitability, an oxygen atom, a nitrogen atom, or a sulfur atom is preferable.

Among these, from the viewpoint of repetitive imprint suitability, it is preferable that the above-described 5-membered ring structure includes, as ring members, at least one oxygen atom or one sulfur atom, and one nitrogen atom, or includes, as ring members, at least two nitrogen atoms.

In addition, from the viewpoint of robustness with respect to the exposure amount, it is preferable that the above-described 5-membered ring structure includes, as ring members, at least one oxygen atom and one nitrogen atom.

The number of heteroatoms in the 5-membered ring structure is preferably 2 to 4, more preferably 2 or 3, and particularly preferably 2.

The 5-membered ring structure preferably includes, as a ring member, —O—, —NR—, —N═, or —S—, and more preferably includes —O—, —$NR^N$—, or —N═.

The $R^N$ is a hydrogen atom or an organic group, and is preferably a hydrogen atom, a hydrocarbon group, or a group formed by a combination of a hydrocarbon group and at least one structure selected from the group consisting of —O—, —C(═O)—, —S—, —$SO_2$—, —NR—, and —P(═O)(C(═O)—$)_2$.

As the above-described hydrocarbon group, an alkyl group, an aromatic hydrocarbon group, or a group represented by a combination of these groups is preferable, an alkyl group having 1 to 10 carbon atoms, an aromatic hydrocarbon group having 6 to 20 carbon atoms, or a group represented by a combination of these groups is more preferable, and an alkyl group having 1 to 4 carbon atoms, a phenyl group, or a group represented by a combination of these groups is still more preferable.

In addition, in the present invention, from the viewpoint of robustness with respect to the exposure amount, it is also preferable that the 5-membered ring structure includes, as ring members, —O— and at least one of —$NR^N$— or —N═, and it is more preferable to include —O— and —$NR^N$—.

From the viewpoint of repetitive imprint suitability, it is also preferable that all carbon atoms included in the above-described 5-membered ring structure as ring members are $sp^2$ carbon atoms. The $sp^2$ carbon atom refers to a carbon having two single bonds and one double bond in a planar structure, and for example, it refers to a carbon atom included in —C(═O)—, —C(═S)—, —C(═$NR^N$)—, —C($R^N$)═N—, or —C(═$CR^N_2$)—. $R^N$ is as described above.

Among these, from the viewpoint of repetitive imprint suitability, it is preferable that the above-described 5-membered ring structure further includes, as a ring member, a carbon atom in at least one structure selected from the group consisting of —C(═O)—, —C(═S)—, —C(═$NR^N$)—, and —C($R^N$)═N—.

In addition, from the viewpoint of adhesiveness, it is also preferable that the above-described 5-membered ring structure further includes, as a ring member, a carbon atom in a structure represented by —C(═$CR^1R^2$)— (that is, a carbon atom which is not directly bonded to $R^1$ and $R^2$), and $R^1$ and $R^2$ each independently represent a hydrogen atom or an organic group.

Examples of the organic group in $R^1$ and $R^2$ include a hydrocarbon group and a group formed by a combination of a hydrocarbon group and at least one structure selected from the group consisting of —O—, —C(═O)—, —S—, —$SO_2$—, —$NR^N$—, and —P(═O)(C(═O)—$)_2$. $R^N$ is as described above. These groups may further have a substituent, and examples of the substituent include an amino group, an alkoxy group, an aryloxy group, an alkylcarbonyloxy group, and an arylcarbonyloxy group. In addition, in a case where the organic groups in $R^1$ and $R^2$ form a ring structure, a polycyclic structure such as a fused ring structure may be formed. Examples of the ring structure formed by such a fused ring structure include a carbazole ring structure.

From the viewpoint of adhesiveness, an aspect in which one of $R_1$ or $R_2$ is a hydrogen atom and the other is an organic group is also one of preferred aspects of the present invention.

Among these, as the ring members in the above-described 5-membered ring structure, it is preferable to include the above-described heteroatom, at least one carbon atom selected from the group consisting of —C(═O)—, —C(═S)—, —C(═$NR^N$)—, and —C($R^N$)═N—, and the carbon atom in the structure represented by —C(═$CR^1R^2$)—; and it is more preferable to consist of the above-described heteroatom, at least one carbon atom selected from the group consisting of —C(═O)—, —C(═S)—, —C(═$NR^N$)—, and —C($R^N$)═N—, and the carbon atom in the structure represented by —C(═$CR^1R^2$)—.

Specific examples of a structure including the above-described 5-membered ring structure are shown below, but the present invention is not limited thereto. In addition, in the following formulae, * represents a bonding site with another structure.

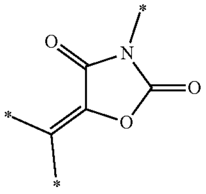
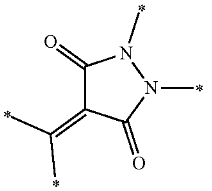
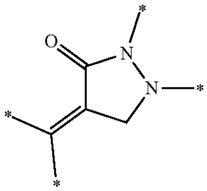
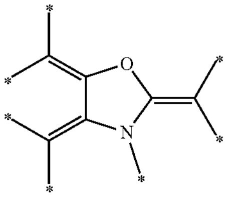
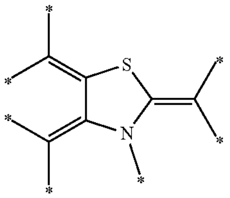
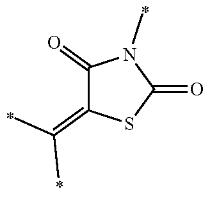
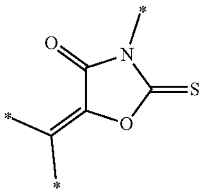
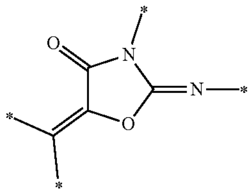
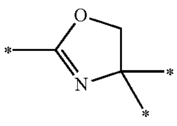
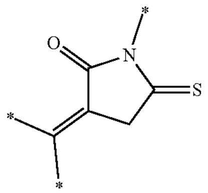
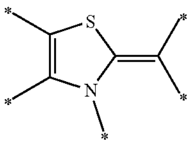
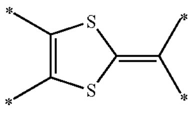

-continued

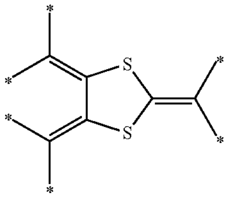
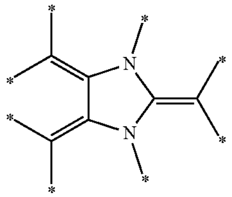
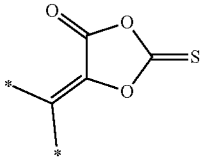
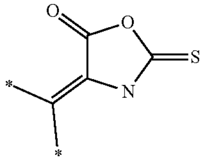
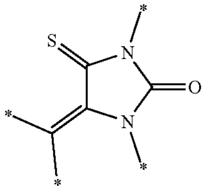

[Aromatic Organic Group]

From the viewpoint of repetitive imprint suitability, it is also preferable that the specific compound is a compound having an aromatic organic group.

Examples of the aromatic organic group include an aromatic hydrocarbon group such as a phenyl group and a naphthyl group, and an aromatic heterocyclic group such as a furanyl group, a pyridinyl group, and a carbazole group. Each of these aromatic hydrocarbon groups and aromatic heterocyclic groups may further have a substituent.

The specific compound may have the aromatic organic group at any position in the molecule.

For example, in a case where the specific compound includes —$NR^N$— as the ring member of the above-described 5-membered ring structure, $R^N$ may include the aromatic organic group.

In a case where the specific compound includes —C(═$NR^N$)—, —C($R^N$)═N—, or —C(═$CR^N_2$)— as the ring member of the above-described 5-membered ring structure, $R^N$ may include the aromatic organic group.

The number of aromatic organic groups in the specific compound is not particularly limited, but is preferably 1 to 10 and more preferably 1 to 5.

[Formula (1)]

The specific compound is preferably a compound represented by Formula (1).

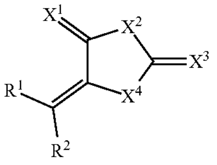

(1)

In Formula (1), $X^1$ to $X^4$ each independently represent O, S, or $NR^N$, $R^N$ represents a hydrogen atom or an organic group, and $R^1$ and $R^2$ each independently represent a hydrogen atom or an organic group, where $R^1$ and $R^2$ may be bonded to each other to form a ring.

Preferred aspects of $R^N$, $R^1$, and $R^2$ are as described above.

In Formula (1), $X^1$ is preferably O or S, and more preferably O.

In Formula (1), $X^2$ is preferably $NR^N$.

In Formula (1), $X^3$ is preferably O or S, and more preferably O.

In Formula (1), $X^4$ is preferably O or S, and more preferably O.

From the viewpoint of repetitive imprint suitability, it is preferable that, in Formula (1), $X^1$ is O and $X^2$ is $NR^N$.

Moreover, an aspect in which $X^1$ is O, $X^2$ is $NR^N$, and $X^4$ is O or S (preferably O) is also one of preferred aspects of the present invention.

It is preferable that the compound represented by Formula (1) includes the above-described aromatic organic group, it is more preferable that at least one of $R^1$ or $R^2$ in Formula (1) is the aromatic organic group, and it is still more preferable that one of $R^1$ or $R^2$ in Formula (1) is the aromatic organic group.

Preferred aspects of the aromatic organic group are as described above.

[Formula (2)]

The specific compound is preferably a compound represented by Formula (2).

(2)

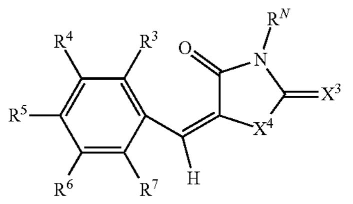

In Formula (2), $X^3$ and $X^4$ each independently represent O, S, or $NR^N$, $R^N$ represents a hydrogen atom or an organic group, and $R^3$ to $R^7$ each independently represent a hydrogen atom or an organic group, where $R^3$ to $R^7$ may be bonded to each other to form a ring.

In Formula (2), $X^3$ is preferably O or S, and more preferably O.

In Formula (2), $X^4$ is preferably O or S, and more preferably O.

In Formula (2), it is preferable that $R^3$ to $R^7$ are each independently an alkyl group, an aryl group, an amino group, an alkoxy group, an aryloxy group, an alkylcarbonyloxy group, or an arylcarbonyloxy group.

In Formula (2), $R^3$ to $R^7$ may be bonded to each other to form a ring, and examples of the ring and the ring formed by the benzene ring in Formula (2) include a naphthalene ring and a carbazole ring.

[Molecular Weight]

From the viewpoint of repetitive imprint suitability, a molecular weight of the specific compound is preferably 200 to 1,500, more preferably 250 to 1,000, and still more preferably 300 to 800.

In a case where the molecular weight is the above-described lower limit or more, volatilization of the specific compound, diffusion into other layers, and the like can be suppressed.

[Sensitizing Effect]

From the viewpoint of adhesiveness and robustness with respect to the exposure amount, it is preferable that the specific compound is a compound having a sensitizing effect on the polymerization of the polymerizable compound described later.

Specifically, it is preferable that the specific compound is in an electron-excited state during curing, and comes into contact with the polymerization initiator to cause actions such as electron migration, energy transfer, and heat generation, thereby increasing generation of polymerization initiation species from the polymerization initiator.

In a case where the polymerization initiator described later is a photoradical polymerization initiator, it is preferable that the specific compound is in an electron-excited state during exposure, and comes into contact with the photoradical polymerization initiator and causes actions such as electron migration, energy transfer, and heat generation, thereby promoting generation of radicals from the photoradical polymerization initiator.

In a case where a rate of polymerization reaction in the curable composition for imprinting according to the embodiment of the present invention, containing the specific compound, is higher than a rate of polymerization reaction in a composition obtained by removing only the specific compound from the curable composition for imprinting according to the embodiment of the present invention (hereinafter, also referred to as "composition B"), the specific compound is a compound having a sensitizing effect on the polymerization of the polymerizable compound described later.

The polymerization rate is measured, for example, by the following method in a case where the polymerization initiator is a photopolymerization initiator.

Using FT-IR (Nicolet iS50R manufactured by Thermo Fisher Scientific Inc.) having a RapidScan function, each reaction rate of curing of the curable composition for imprinting according to the embodiment of the present invention and the composition B is measured by attenuated total reflection (ATR).

1 μL of each composition is dropped onto a diamond-made prism, and slide glass is overlaid on the prism from above the composition. Subsequently, the composition for forming a pattern is exposed to ultraviolet rays using an ultra-high pressure mercury lamp.

In the exposure, for the polymerizable group of the polymerizable compound in the composition, the reaction rate at 0.5 seconds after the exposure is measured using the FT-IR device. Exposure conditions and measurement conditions by the FT-IR device can be, for example, the conditions described below. In addition, the reaction rate is defined by the following expression while focusing on a decrease in an infrared absorption peak (near 1,630 $cm^{-1}$) due to C=C stretching vibration of a vinyl group. In the following expression, "peak surface area" indicates a peak surface area of an FT-IR spectrum in a range of 1,650 to 1,600 $cm^{-1}$.

Reaction rate (%)=[(Peak surface area before exposure)−(Peak surface area at 0.5 seconds after exposure)]/[Peak surface area before exposure]×100

Exposure conditions
illuminance at wavelength of 313 nm: 100 ($mW/cm^2$)
illuminance at wavelength of 365 nm: 135 ($mW/cm^2$)
illuminance at wavelength of 405 nm: 115 ($mW/cm^2$)
exposure time: 1 second
Measurement conditions by FT-IR
measured wave number range: 3,500 to 400 cm-1
wave number resolution: 32 cm-1
number of times of high-speed scan: 100 spectra/sec Specific Example Examples of the specific compound include compounds used in Examples described later and compound represented by Formulae D-1 to D-10, but the present invention is not limited thereto.

D-1

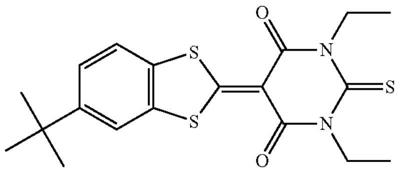

D-2

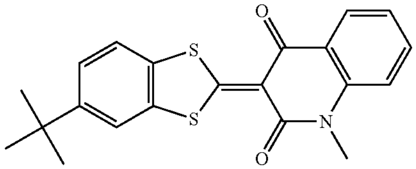

D-3

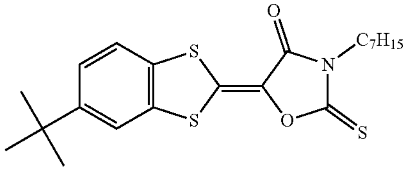

D-4

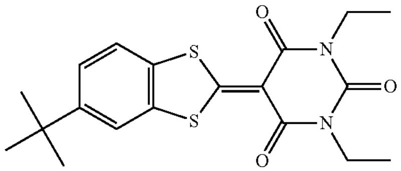

D-5

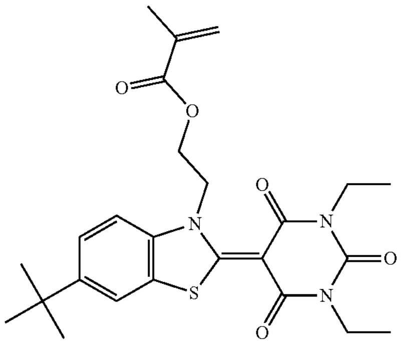

D-6

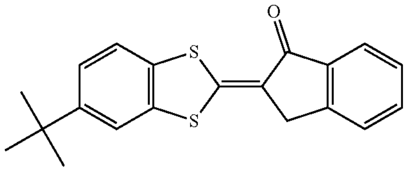

D-7

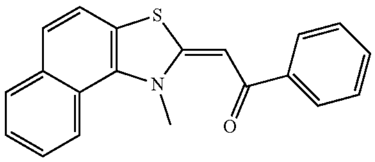

-continued

D-8

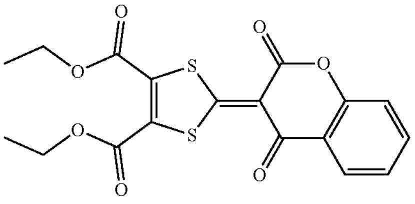

D-9

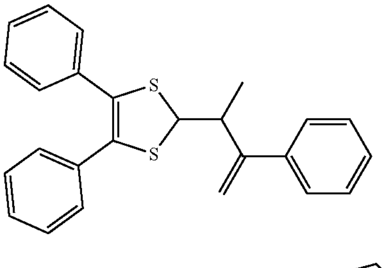

D-10

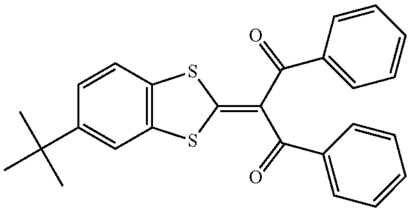

[Content]

A content of the specific compound is preferably 0.0001% to 10% by mass, more preferably 0.0005% to 5% by mass, and still more preferably 0.001% to 2% by mass with respect to the total solid content of the curable composition for imprinting according to the embodiment of the present invention.

In a case where two or more kinds of the specific compounds are used, the total amount thereof is preferably within the above-described range.

<Polymerizable Compound>

The curable composition for imprinting according to the embodiment of the present invention contains a polymerizable compound.

The polymerizable compound may be a compound corresponding to the above-described specific compound.

In the curable composition for imprinting according to the embodiment of the present invention, it is preferable that, among components contained in the curable composition for imprinting according to the embodiment of the present invention, other than a solvent, a component with the highest content is the polymerizable compound. The polymerizable compound may have one polymerizable group or two or more polymerizable groups in one molecule. At least one kind of polymerizable compounds contained in the curable composition for imprinting preferably has two to five polymerizable groups, more preferably has two to four polymerizable groups, still more preferably has two or three polymerizable groups, and even more preferably has three polymerizable groups, in one molecule.

The type of the polymerizable group included in the polymerizable compound is not particularly specified, and examples thereof include a group having an ethylenically unsaturated group and a cyclic ether group (an epoxy group, a glycidyl group, and an oxetanyl group). Among them, a group having an ethylenically unsaturated group is preferable. Examples of the group having an ethylenically unsaturated group include a (meth)acryloyl group, a (meth)acryloyloxy group, a (meth)acryloylamino group, a vinyl group, a vinyloxy group, an allyl group, and a vinylphenyl group. Among them, a (meth)acryloyl group or a (meth)acryloyloxy group is more preferable, and an acryloyl group or an acryloyloxy group is still more preferable.

At least one kind of polymerizable compounds contained in the curable composition for imprinting preferably has a cyclic structure. Examples of this cyclic structure include an aliphatic hydrocarbon ring Cf and an aromatic hydrocarbon ring Cr. Among these, the polymerizable compound preferably has the aromatic hydrocarbon ring Cr and more preferably has a benzene ring.

A molecular weight of the polymerizable compound is preferably 100 to 900.

The at least one kind of the above-described polymerizable compounds is preferably represented by Formula (I-1).

(I-1)

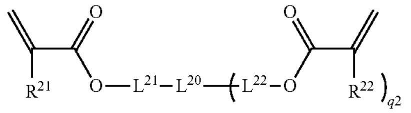

$L^{20}$ is a (1+q2)-valent linking group, and examples thereof include a linking group having a cyclic structure. Examples of the cyclic structure include examples of the ring Cf, the ring Cr, the ring Cn, the ring Co, and the ring Cs.

$R^{21}$ and $R^{22}$ each independently represent a hydrogen atom or a methyl group.

$L^{21}$ and $L^{22}$ each independently represent a single bond or a linking group L described later. $L^{20}$ and $L^{21}$ or $L^{22}$ may be bonded to each other through or without the linking group L to form a ring. $L^{20}$, $L^{21}$, and $L^{22}$ may have a substituent. A plurality of substituents may be bonded to each other to form a ring. In a case where there are the plurality of substituents T, the plurality of substituents may be the same as or different from each other.

q2 is an integer of 0 to 5, preferably an integer of 0 to 3, more preferably an integer of 0 to 2, and still more preferably 0 or 1.

[High-Molecular-Weight Polymerizable Compound]

Moreover, the curable composition for imprinting may contain, as the polymerizable compound, a polymerizable compound having a weight-average molecular weight of 800 or more (hereinafter, also referred to as a "high-molecular-weight polymerizable compound").

Examples of the high-molecular-weight polymerizable compound include a compound (silicon-containing compound) containing a silicon atom (Si), a compound (ring-containing compound) containing a cyclic structure, and a dendrimer-type compound, and a silicon-containing compound or a ring-containing compound is preferable and a silicon-containing compound is more preferable.

A weight-average molecular weight of the high-molecular-weight polymerizable compound is 800 or more, preferably 1,000 or more, more preferably 1,500 or more, and still more preferably more than 2,000. The upper limit of the weight-average molecular weight is not particularly specified, but for example, 100,000 or less is preferable, 50,000 or less is more preferable, 10,000 or less is still more preferable, 8,000 or less is even more preferable, 5,000 or less is even still more preferable, 3,500 or less is particularly preferable, and 3,000 or less is more particularly preferable.

By setting the molecular weight to the above-described lower limit value or more, a volatility of the compound is suppressed, and characteristics of the composition or a coating film are stabilized. Moreover, good viscosity for maintaining a morphology of the coating film can be ensured. Further, it is possible to realize good releasability of the film by complementing the effect of suppressing a mold release agent to a small amount. By setting the molecular weight to the above-described upper limit value or lower, it is easy to secure a low viscosity (fluidity) required for pattern filling, which is preferable.

—Silicon-Containing Compound—

Examples of the silicon-containing compound include a compound having a silicone skeleton. Specific examples thereof include a compound having at least one of a D-unit siloxane structure represented by Formula (S1) or a T-unit siloxane structure represented by Formula (S2).

(S1)

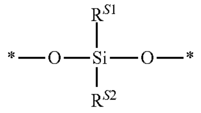

(S2)

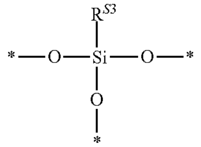

In Formula (S1) or Formula (S2), $R^{S1}$ to $R^{S3}$ each independently represent a hydrogen atom or a monovalent substituent, and *'s each independently represent a bonding site with other structures.

$R^{S1}$ to $R^{S3}$ are each independently preferably a monovalent substituent.

As the above-described monovalent substituent, an aromatic hydrocarbon group (preferably having 6 to 22 carbon atoms, more preferably having 6 to 18 carbon atoms, and still more preferably having 6 to 10 carbon atoms) or an aliphatic hydrocarbon group (preferably having 1 to 24 carbon atoms, more preferably having 1 to 12 carbon atoms, and still more preferably having 1 to 6 carbon atoms) is preferable, and among them, a cyclic or chain (linear or branched) alkyl group (preferably having 1 to 12 carbon atoms, more preferably having 1 to 6 carbon atoms, and still more preferably having 1 to 3 carbon atoms) or a group including a polymerizable group is preferable.

Specific examples of a structure of the silicon-containing compound include the following examples of Formulae (s-1) to (s-9) in terms of partial structure. Q in the formulae is a group including the above-described polymerizable group. A plurality of these structures may be present in the compound, or may be present in combination.

(s-1)

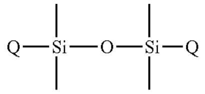

(s-2)

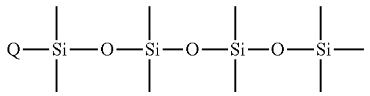

-continued (s-3)

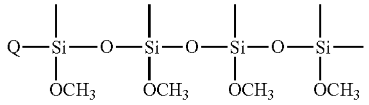

(s-4)

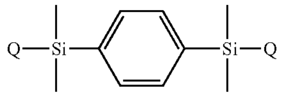

(s-5)

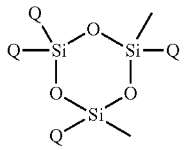

(s-6)

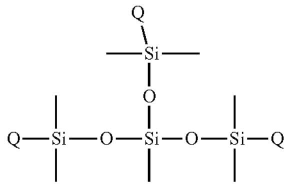

(s-7)

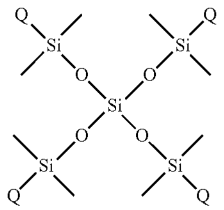

(s-8)

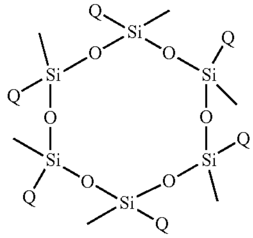

(s-9)

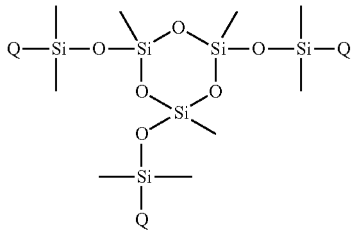

The silicon-containing compound is preferably a reactant of a silicone resin and a compound having a polymerizable group.

As the above-described silicone resin, a reactive silicone resin is preferable.

Examples of the reactive silicone resin include a modified silicone resin having the above-described silicone skeleton, and for example, a monoamine-modified silicone resin, a diamine-modified silicone resin, a special amino-modified silicone resin, an epoxy-modified silicone resin, an alicyclic epoxy-modified silicone resin, a carbinol-modified silicone resin, a mercapto-modified silicone resin, a carboxy-modified silicone resin, a hydrogen-modified silicone resin, an amino-polyether-modified silicone resin, an epoxy-polyether-modified silicone resin, an epoxy-aralkyl-modified silicone resin, and the like can be mentioned.

As the above-described compound having a polymerizable group, a compound having a polymerizable group and a group capable of reacting with an alkoxysilyl group or a silanol group is preferable, and a compound having a polymerizable group and a hydroxy group is more preferable.

Moreover, in a case where the above-described modified silicone resin is used as the silicone resin, as the above-described compound having a polymerizable group, a compound having a polymerizable group and a group which reacts with an amino group, an epoxy group, a mercapto group, a carboxy group, and the like, which are included in the above-described modified silicone resin, may be used.

A preferred aspect of the polymerizable group in the above-described compound having a polymerizable group is the same as the preferred aspect of the polymerizable group in the above-described polymerizable compound.

As the above-described compound having a polymerizable group, among them, hydroxyalkyl (meth)acrylate is preferable, and 2-hydroxyethyl (meth)acrylate is more preferable.

More specifically, a reactant of a compound having a polymerizable group and a group (for example, a hydroxy group) capable of reacting with an alkoxysilyl group or a silanol group and a silicone resin having an alkoxysilyl group or a silanol group is preferable.

—Ring-Containing Compound—

Examples of a cyclic structure of the compound (ring-containing compound) containing a ring include an aromatic ring and an alicyclic ring. Examples of the aromatic ring include an aromatic hydrocarbon ring and an aromatic heterocyclic ring.

The aromatic hydrocarbon ring preferably has 6 to 22 carbon atoms, more preferably has 6 to 18 carbon atoms, and still more preferably has 6 to 10 carbon atoms. Specific examples of the aromatic hydrocarbon ring include a benzene ring, a naphthalene ring, an anthracene ring, a phenanthrene ring, a phenalene ring, a fluorene ring, a benzocyclooctene ring, an acenaphthylene ring, a biphenylene ring, an indene ring, an indane ring, a triphenylene ring, a pyrene ring, a chrysene ring, a perylene ring, and a tetrahydronaphthalene ring. Among them, a benzene ring or a naphthalene ring is preferable, and a benzene ring is more preferable. The aromatic ring may have a structure in which a plurality of rings is linked to each other, and examples thereof include a biphenyl structure and a diphenylalkane structure (for example, 2,2-diphenylpropane) (the aromatic hydrocarbon ring specified here is referred to as aCy).

The aromatic heterocyclic ring preferably has 1 to 12 carbon atoms, more preferably has 1 to 6 carbon atoms, and still more preferably has 1 to 5 carbon atoms. Specific examples thereof include a thiophene ring, a furan ring, a dibenzofuran ring, a pyrrole ring, an imidazole ring, a benzimidazole ring, a pyrazole ring, a triazole ring, a tetrazole ring, a thiazole ring, a thiadiazole ring, an oxadiazole ring, an oxazole ring, a pyridine ring, a pyrazine ring, a pyrimidine ring, a pyridazine ring, an isoindole ring, an indole ring, an indazole ring, a purine ring, a quinolidine ring, an isoquinoline ring, a quinoline ring, a phthalazine ring, a naphthylidine ring, a quinoxaline ring, a quinazoline ring, a cinnoline ring, a carbazole ring, an acridine ring, a phenazine ring, a phenothiazine ring, a phenoxathiin ring, and a phenoxazine ring (the aromatic heterocyclic ring specified here is referred to as hCy).

The alicyclic ring preferably has 3 to 22 carbon atoms, more preferably has 4 to 18 carbon atoms, and still more preferably has 6 to 10 carbon atoms. Specific examples of the aliphatic hydrocarbon ring include a cyclopropane ring, a cyclobutane ring, a cyclobutene ring, a cyclopentane ring, a cyclohexane ring, a cyclohexene ring, a cycloheptane ring, a cyclooctane ring, a dicyclopentadiene ring, a spirodecane ring, a spirononane ring, a tetrahydrodicyclopentadiene ring, an octahydronaphthalene ring, a decahydronaphthalene ring, a hexahydroindane ring, a bornane ring, a norbornane ring, a norbornene ring, a isobornane ring, a tricyclodecane ring, a tetracyclododecane ring, and an adamantane ring. Examples of the aliphatic hetero ring include a pyrrolidine ring, an imidazolidine ring, a piperidine ring, a piperazine ring, a morpholine ring, an oxirane ring, an oxetane ring, an oxolane ring, an oxane ring, and a dioxane ring (the alicyclic ring specified here is referred to as fCy).

In the present invention, in a case where the high-molecular-weight polymerizable compound is a ring-containing compound, a compound containing an aromatic hydrocarbon ring is preferable, and a compound having a benzene ring is more preferable. Examples thereof include a compound having a structure represented by Formula (C-1).

(C-1)

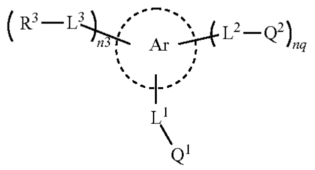

In the formula, Ar represents the above-described aromatic hydrocarbon ring or aromatic heterocyclic ring.

$L^1$ and $L^2$ are each independently a single bond or a linking group. Examples of the linking group include an oxygen atom (oxy group), a carbonyl group, an amino group, an alkylene group (preferably having 1 to 12 carbon atoms, more preferably having 1 to 6 carbon atoms, and still more preferably 1 to 3 carbon atoms), and a group of a combination of these groups. Among them, a (poly)alkyleneoxy group is preferable. The (poly)alkyleneoxy group may be a group having one alkyleneoxy group or a group in which a plurality of alkyleneoxy groups is repeatedly linked. Moreover, an order of the alkylene group and the oxy group is not limited. The repetition number of the alkyleneoxy group is preferably 1 to 24, more preferably 1 to 12, and still more preferably 1 to 6. Moreover, the (poly)alkyleneoxy group may be intervened with an alkylene group (preferably having 1 to 24 carbon atoms, more preferably having 1 to 12 carbon atoms, and still more preferably having 1 to 6 carbon atoms) in relation to linking with the ring Ar which is a mother nucleus or with the polymerizable group Q. Therefore, (poly)alkyleneoxy=alkylene group may be used.

$R^3$ is an optional substituent, and examples thereof include an alkyl group (preferably having 1 to 12 carbon atoms, more preferably having 1 to 6 carbon atoms, and still more preferably having 1 to 3 carbon atoms), an alkenyl group (preferably having 2 to 12 carbon atoms, more preferably having 2 to 6 carbon atoms, and still more preferably having 2 or 3 carbon atoms), an aryl group (preferably having 6 to 22 carbon atoms, more preferably having 6 to 18 carbon atoms, and still more preferably having 6 to 10 carbon atoms), an arylalkyl group (preferably having 7 to 23 carbon atoms, more preferably having 7 to 19 carbon atoms, and still more preferably having 7 to 11 carbon atoms), a hydroxy group, a carboxy group, an alkoxy group (preferably having 1 to 24 carbon atoms, more preferably having 1 to 12 carbon atoms, and still more preferably having 1 to 6 carbon atoms), an acyl group (preferably having 2 to 12 carbon atoms, more preferably having 2 to 6 carbon atoms, and still more preferably having 2 or 3 carbon atoms; also preferably an alkylcarbonyl group), and an aryloyl group (preferably having 7 to 23 carbon atoms, more preferably having 7 to 19 carbon atoms, and still more preferably having 7 to 11 carbon atoms).

$L^3$ is a single bond or a linking group. Examples of the linking group include the examples of $L^1$ and $L^2$ described above.

n3 is preferably 3 or less, more preferably 2 or less, still more preferably 1 or less, and particularly preferably 0.

$Q^1$ and $Q^2$ are each independently a polymerizable group, and the example of the above-described polymerizable group is preferable.

In the ring-containing compound, in a case where the number of side chains having a polymerizable group is increased, it is possible to form a strong crosslinking structure during curing, and the resolution tends to be improved. From this viewpoint, nq is 1 or more, preferably 2 or more. The upper limit thereof is preferably 6 or less, more preferably 4 or less, and still more preferably 3 or less.

Similarly, from the viewpoint of easily forming a uniform crosslinking structure, in a case where a group including a polymerizable group or a substituent is introduced into the cyclic structure, it is preferable that the substituents are arranged in series.

—Dendrimer-Type Compound—

The high-molecular-weight polymerizable compound may be a dendrimer-type compound. The dendrimer means a dendritic polymer having a structure which branches regularly from a center. The dendrimer is composed of a central molecule (stem) called as a core and a side chain portion (branch) called as a dendron. As a whole, a fan-shaped compound is common, but a dendrimer in which dendrons are spread in a semicircular or circular shape may be used. A group having a polymerizable group can be introduced into a dendron portion (for example, a terminal portion away from the core) of the dendrimer to obtain the polymerizable compound. In a case where a (meth)acryloyl group is used as the polymerizable group to be introduced, a dendrimer-type polyfunctional (meth)acrylate can be obtained.

For the dendrimer-type compound, for example, matters described in JP5512970B can be referred to, the description of which is incorporated in the present specification.

—Polymerizable Group Equivalent—

A polymerizable group equivalent of the high-molecular-weight polymerizable compound is preferably 130 or more, more preferably 150 or more, still more preferably 160 or more, even more preferably 190 or more, and even still more preferably 240 or more. The upper limit value of the polymerizable group equivalent is preferably 2,500 or less, more preferably 1,800 or less, still more preferably 1,000 or less, even more preferably 500 or less, and even still more preferably 350 or less, and may be 300 or less.

The polymerizable group equivalent is calculated by the following expression.

(Polymerizable group equivalent)=(Number-average molecular weight of polymerizable compound)/(Number of polymerizable groups in polymerizable compound)

In a case where the polymerizable group equivalent of the high-molecular-weight polymerizable compound is the above-described lower limit value or more, it is considered that the elastic modulus during curing is in an appropriate range and the releasability is excellent. On the other hand, in a case where the polymerizable group equivalent is the above-described upper limit value or less, it is considered that a crosslinking density of the cured substance pattern is in an appropriate range and the resolution of the transfer pattern is excellent.

In a case of the silicon-containing compound, the number of polymerizable groups in the high-molecular-weight polymerizable compound is preferably 2 or more, more preferably 3 or more, and still more preferably 4 or more in one molecule. The upper limit thereof is preferably 50 or less, more preferably 40 or less, still more preferably 30 or less, and even more preferably 20 or less.

In a case of the ring-containing compound, it is preferable to be 2 or more in one molecule. The upper limit thereof is preferably 4 or less and more preferably 3 or less.

Alternatively, in a case of the dendrimer-type compound, it is preferable to be 5 or more, more preferably 10 or more, and still more preferably 20 or more in one molecule. The upper limit thereof is preferably 1,000 or less, more preferably 500 or less, and still more preferably 200 or less.

—Viscosity—

A viscosity of the high-molecular-weight polymerizable compound at 23° C. is preferably 100 mPa·s or greater, more preferably 120 mPa·s or greater, and still more preferably 150 mPa·s or greater. The upper limit value of the above-described viscosity is preferably 2,000 mPa·s or lower, more preferably 1,500 mPa·s or lower, and still more preferably 1,200 mPa·s or lower.

Unless otherwise specified, the viscosity in the present specification is a value measured with an E-type rotational viscometer RE85L manufactured by TOKI SANGYO CO., LTD. and a standard cone rotor (1° 34'×$R^{24}$) in a state where a temperature of a sample cup is adjusted to 23° C. Other details regarding the measurement are in accordance with JIS Z 8803:2011. Two samples are produced for one level and are respectively measured three times. An arithmetic mean value of a total of six times is adopted as an evaluation value.

Examples of the polymerizable compound include compounds used in the following Examples, the compounds described in paragraphs 0017 to 0024 and Examples of JP2014-090133A, the compounds described in paragraphs 0024 to 0089 of JP2015-009171A, the compounds described in paragraphs 0023 to 0037 of JP2015-070145A, and the compounds described in paragraphs 0012 to 0039 of WO2016/152597A, but the present invention is not construed as being limited thereto.

With respect to the total solid content of the curable composition for imprinting, a content of the polymerizable compound is preferably 30% by mass or greater, more preferably 45% by mass or greater, still more preferably 50% by mass or greater, and even more preferably 55% by mass or greater, and may be 60% by mass or greater or further 70% by mass or greater. In addition, the upper limit value thereof is preferably lower than 99% by mass and more preferably 98% by mass or lower, and can also be 97% by mass or lower.

It is preferable that a boiling point of the polymerizable compound is set and designed on formulation in relation to a polymerizable compound contained in a composition for forming a closely adhesive layer, which will be described later. The boiling point of the polymerizable compound is preferably 500° C. or lower, more preferably 450° C. or lower, and still more preferably 400° C. or lower. The lower limit value thereof is preferably 200° C. or higher, more preferably 220° C. or higher, and still more preferably 240° C. or higher.

<Polymerization Initiator>

The curable composition for imprinting contains a polymerization initiator, and preferably contains at least one of a thermal polymerization initiator or a photopolymerization initiator.

As the polymerization initiator, from the viewpoint that it can be used for the optical imprinting method, a photopolymerization initiator is preferable.

As the photopolymerization initiator, any compound which generates active species which polymerize the above-described polymerizable compound by irradiation with light can be used. As the photopolymerization initiator, a radical polymerization initiator or a cationic polymerization initiator is preferable, and a radical polymerization initiator is more preferable. Moreover, in the present invention, a plurality of kinds of photopolymerization initiators may be used in combination.

A content of the photopolymerization initiator used in the present invention is, for example, 0.01% to 15% by mass with respect to the total solid content of the curable composition for imprinting, preferably 0.1% to 12% by mass and more preferably 0.2% to 7% by mass. In a case where two or more kinds of the photopolymerization initiators are used, the total amount thereof is preferably within the above-described range.

In a case where the content of the photopolymerization initiator is 0.01% by mass or greater, sensitivity (rapid curing properties), resolution, line edge roughness, and coating film strength tend to be improved, which is preferable. On the other hand, in a case where the content of the photopolymerization initiator is 15% by mass or lower, light transmittance, colorability, handleability, and the like tend to be improved, which is preferable.

As a radical photopolymerization initiator used in the present invention, for example, a commercially available initiator can be used. As these examples, for example, those described in paragraph 0091 of JP2008-105414A can be preferably adopted. Among these, from the viewpoint of curing sensitivity and absorption characteristics, an acetophenone-based compound, a phenylglioxylate-based compound, an acylphosphine oxide-based compound, or an oxime ester-based compound is preferable.

In addition, from the viewpoint of repetitive imprint suitability, a polymerization initiator having an acylphosphine oxide group in a molecule is preferable.

Preferred examples of the acetophenone-based compound include a hydroxyacetophenone-based compound, a dialkoxyacetophenone-based compound, and an aminoacetophenone-based compound. Preferred examples of the hydroxyacetophenone-based compound include Irgacure (registered trademark) 2959 (1-[4-(2-hydroxyethoxy)phenyl]-2-hydroxy-2-methyl-1-propan-1-one), Irgacure (registered trademark) 184 (1-hydroxycyclohexyl phenyl ketone), Irgacure (registered trademark) 500 (1-hydroxycyclohexyl phenyl ketone, benzophenone), and Darocure (registered trademark) 1173 (2-hydroxy-2-methyl-1-phenyl-1-propan-1-one), which are available from BASF SE.

Preferred examples of the dialkoxyacetophenone-based compound include Irgacure (registered trademark) 651 (2,2-dimethoxy-1,2-diphenylethan-1-one) which is available from BASF SE.

Preferred examples of the aminoacetophenone-based compound include Irgacure (registered trademark) 369 (2-benzyl-2-dimethylamino-1-(4-morpholinophenyl)butanone-1), Irgacure (registered trademark) 379(EG) (2-dimethylamino-2-(4-methylbenzyl)-1-(4-morpholin-4-ylphenyl)butan-1-one), and Irgacure (registered trademark) 907 (2-methyl-1-[4-(methylthio)phenyl]-2-(4-morpholinyl)-1-propanone), which are available from BASF SE.

Preferred examples of the phenylglioxylate-based compound include Irgacure (registered trademark) 754 and Darocure (registered trademark) MBF, which are available from BASF SE.

Preferred examples of the acylphosphine oxide-based compound (polymerization initiator having an acylphosphine oxide group in the molecule) include Irgacure (registered trademark) 819 (bis(2,4,6-trimethylbenzoyl)-phenylphosphine oxide) and Irgacure (registered trademark) 1800 (bis(2,6-dimethoxybenzoyl)-2,4,4-trimethyl-pentylphosphine oxide), which are available from BASF SE, and Lucirin TPO (2,4,6-trimethylbenzoyldiphenylphosphine oxide) and Lucirin TPO-L (2,4,6-trimethylbenzoylphenylethoxyphosphine oxide), which are available from BASF SE.

Preferred examples of the oxime ester-based compound include Irgacure (registered trademark) OXE01 (1,2-octanedione, 1-[4-(phenylthio)phenyl]-2-(O-benzoyloxime)) and Irgacure (registered trademark) OXE02 (ethanone, 1-[9-ethyl-6-(2-methylbenzoyl)-9H-carbazol-3-yl]-, 1-(O-acetyloxime)), which are available from BASF SE.

In the present invention, "light" includes not only light having a wavelength in an ultraviolet, near-ultraviolet, far-ultraviolet, visible, or infrared range, or an electromagnetic wave but also a radiation. The above-described radiation includes, for example, microwaves, electron beams, EUV, and X-rays. In addition, laser light such as a 248-nm excimer laser, a 193-nm excimer laser, and a 172-nm excimer laser can also be used. The light may be monochromatic light (single-wavelength light) passing through an optical filter, or may be light (composite light) with a plurality of different wavelengths. The exposure can be a multiple exposure, and it is also possible to expose the entire surface after forming a pattern for the purpose of increasing film hardness and etching resistance.

[Mold Release Agent]

The curable composition for imprinting according to the embodiment of the present invention preferably contains a mold release agent.

A content of the mold release agent is preferably 0.1% by mass or greater, more preferably 0.3% by mass or greater, still more preferably 0.5% by mass or greater, and particularly preferably 0.6% by mass or greater with respect to the total solid content of the composition. The upper limit value thereof is preferably lower than 1.0% by mass, more preferably 0.9% by mass or lower, and still more preferably 0.85% by mass or lower.

In a case where the content of the mold release agent is the above-described lower limit value or greater, the releasability is improved, and peeling of the cured film and damage to the mold during mold release can be prevented. Moreover, in a case of being the above-described upper limit value or lower, a pattern strength during curing is not excessively lowered due to the influence of the mold release agent, so that good resolution can be realized.

The mold release agent may be used alone or in combination of a plurality thereof. In a case where a plurality thereof is used, the total amount thereof is within the above-described range.

The type of the mold release agent is not particularly limited, but it is preferable to have a function of segregating at an interface with the mold and effectively promoting mold release from the mold. In the present invention, it is preferable that the mold release agent does not substantially include a fluorine atom and a silicon atom. The expression "not substantially include" means that the total amount of the fluorine atom and the silicon atom is 1% by mass or lower of the mold release agent, preferably 0.5% by mass or lower, more preferably 0.1% by mass or lower, and still more preferably 0.01% by mass or lower. From the viewpoint of achieving high releasability of the film and excellent processing resistance to etching and the like, it is preferable that the mold release agent which does not substantially include a fluorine atom and a silicon atom is used in the curable composition for imprinting.

Specifically, the mold release agent used in the present invention is preferably a surfactant. Alternatively, it is preferably an alcohol compound having at least one hydroxy group at a terminal, or a compound ((poly)alkylene glycol compound) having a (poly)alkylene glycol structure in which a hydroxy group is etherified. The surfactant and the (poly)alkylene glycol compound are preferably a non-polymerizable compound not having the polymerizable group. The (poly)alkylene glycol means that an alkylene glycol structure may be one or a plurality of the alkylene glycol structures may be repeatedly linked.

—Surfactant—

As the surfactant which can be used as the mold release agent in the present invention, a nonionic surfactant is preferable.

The nonionic surfactant is a compound having at least one hydrophobic moiety and at least one nonionic hydrophilic moiety. The hydrophobic moiety and the hydrophilic moiety may each be at a terminal of a molecule, or inside. The hydrophobic moiety is composed of, for example, a hydrocarbon group, and the number of carbon atoms in the hydrophobic moiety is preferably 1 to 25, more preferably 2 to 15, still more preferably 4 to 10, and even more preferably 5 to 8. The nonionic hydrophilic moiety preferably has at least one group selected from the group consisting of an alcoholic hydroxyl group, a phenolic hydroxyl group, an ether group (preferably, a (poly)alkyleneoxy group and a cyclic ether group), an amide group, an imide group, a ureide group, a urethane group, a cyano group, a sulfonamide group, a lactone group, a lactam group, and a cyclocarbonate group. Among them, a compound having an alcoholic hydroxyl group or an ether group (preferably, a (poly)alkyleneoxy group and a cyclic ether group) is more preferable.

—Alcohol Compound and (Poly)Alkylene Glycol Compound—

As described above, examples of a preferred mold release agent used in the curable composition for imprinting according to the embodiment of the present invention include an alcohol compound having at least one hydroxy group at a terminal and a (poly)alkylene glycol compound in which a hydroxy group is etherified.

Specifically, the (poly)alkylene glycol compound preferably has an alkyleneoxy group or a polyalkyleneoxy group, and more preferably has a (poly)alkyleneoxy group including an alkylene group having 1 to 6 carbon atoms. Specifically, it is preferable to have a (poly)ethyleneoxy group, a (poly)propyleneoxy group, a (poly)butyleneoxy group, or a mixed structure thereof, it is more preferable to have a (poly)ethyleneoxy group, a (poly)propyleneoxy group, or a mixed structure thereof, and it is still more preferable to have a (poly)propyleneoxy group. The (poly)alkylene glycol compound may be substantially constituted of only a (poly) alkyleneoxy group, except for a substituent at a terminal. Here, the expression "substantially" means that constituent elements other than the (poly)alkyleneoxy group account for 5% by mass or lower and preferably 1% by mass or lower of the entire compound. In particular, it is particularly preferable that the (poly)alkylene glycol compound includes a compound substantially constituted of only the (poly) propyleneoxy group.

The repetition number of alkyleneoxy groups in the (poly)alkylene glycol compound is preferably 3 to 100, more preferably 4 to 50, still more preferably 5 to 30, and even more preferably 6 to 20.

As long as the hydroxy group at the terminal is etherified, the (poly)alkylene glycol compound may have a hydroxy group at the remaining terminal, or may have a terminal hydroxy group in which a hydrogen atom is substituted. As a group in which the hydrogen atom of the terminal hydroxy group may be substituted, an alkyl group (that is, (poly) alkylene glycol alkyl ether) or an acyl group (that is, (poly)alkylene glycol ester) is preferable. A compound having a plurality (preferably, two or three) of (poly)alkylene glycol chains through a linking group can also be preferably used.

Preferred specific examples of the (poly)alkylene glycol compound include polyethylene glycol, polypropylene glycol (for example, manufactured by FUJIFILM Wako Pure Chemical Corporation), mono or dimethyl ether thereof, mono or dibutyl ether, mono or dioctyl ether, mono or dicetyl ether, monostearic acid ester, monooleic acid ester, polyoxyethylene glyceryl ether, polyoxypropylene glyceryl ether, polyoxyethylene lauryl ether, and trimethyl ether thereof.

The (poly)alkylene glycol compound is preferably a compound represented by Formula (P1) or (P2).

(P1)

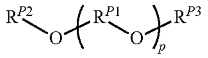

(P1)

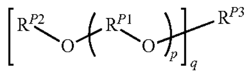

$R^{P1}$ in the formulae is an alkylene group (preferably having 1 to 12 carbon atoms, more preferably having 1 to 6 carbon atoms, and still more preferably having 1 to 3 carbon atoms), which may be a chain group or a cyclic group and may be linear or branched. $R^{P2}$ and $R^{P3}$ are a hydrogen atom or an alkyl group (preferably having 1 to 36 carbon atoms, more preferably having 2 to 24 carbon atoms, and still more preferably having 3 to 12 carbon atoms), which may be a chain group or a cyclic group and may be linear or branched. p is preferably an integer of 1 to 24 and more preferably an integer of 2 to 12.

$R^{P4}$ is a q-valent linking group, and is preferably a linking group composed of an organic group and preferably a linking group composed of a hydrocarbon. Specific examples of the linking group composed of a hydrocarbon include a linking group of an alkane structure (preferably having 1 to 24 carbon atoms, more preferably having 2 to 12 carbon atoms, and still more preferably having 2 to 6 carbon atoms), a linking group of an alkene structure (preferably having 2 to 24 carbon atoms, more preferably having 2 to 12 carbon atoms, and still more preferably having 2 to 6 carbon atoms), and a linking group of an aryl structure (preferably having 6 to 22 carbon atoms, more preferably having 6 to 18 carbon atoms, and still more preferably having 6 to 10 carbon atoms).

q is preferably an integer of 2 to 8, more preferably an integer of 2 to 6, and still more preferably an integer of 2 to 4.

A weight-average molecular weight of the alcohol compound or the (poly)alkylene glycol compound used as the mold release agent is preferably 150 to 6,000, more preferably 200 to 3,000, still more preferably 250 to 2,000, and even more preferably 300 to 1,200.

In addition, examples of a commercially available product of the (poly)alkylene glycol compound which can be used in the present invention include OLFINE E1010 (manufactured by Nissin Chemical Co., Ltd.) and Brij35 (manufactured by Kishida Chemical Co., Ltd.).

<Solvent>

The curable composition for imprinting according to the embodiment of the present invention may contain a solvent.

In a case of using a curable composition for imprinting containing a solvent, for example, the solvent can be removed by drying to obtain a curable film.

In the present invention, a content of the solvent in a case of being contained in the curable composition for imprinting is preferably 90.0% to 99.0% by mass, more preferably 92.0% to 99.0% by mass, and still more preferably 95.0% to 99.0% by mass with respect to the total mass of the curable composition for imprinting.

As the solvent contained in the curable composition for imprinting, a solvent having a boiling point of 80° C. to 200° C. at 1 atm is preferable.

The type of the solvent is not particularly limited, but a solvent having one or more of an ester structure, a ketone structure, a hydroxyl group, or an ether structure is preferable. Examples thereof include propylene glycol monomethyl ether acetate, cyclohexanone, 2-heptanone, gamma-butyrolactone, propylene glycol monomethyl ether, and ethyl lactate.

These solvents may be used alone or in combination.

Among these, from the viewpoint of coating uniformity, a solvent containing propylene glycol monomethyl ether acetate is most preferable.

<Other Additives>

The curable composition for imprinting according to the embodiment of the present invention may contain other additives, in addition to the polymerizable compound, polymerization initiator, mold release agent, and solvent described above. A surfactant, a sensitizer, an antioxidant, a polymerization inhibitor, and the like may be contained as the other additives.

Specific examples of the other additives contained in the curable composition for imprinting, which can be used in the present invention, include additives contained in compositions described in JP2013-036027A, JP2014-090133A, and JP2013-189537A, the contents of which are incorporated in the present specification. In addition, also regarding preparation of the curable composition for imprinting and a pattern producing method, reference can be made to the descriptions in the above-described publications, the contents of which are incorporated in the present specification.

The curable composition for imprinting according to the embodiment of the present invention may also be an aspect in which a high-molecular-weight compound is not substantially contained.

Specifically, it is preferable that a compound having a molecular weight (in a case of having a molecular weight distribution, a weight-average molecular weight) of 2,000 or more is not substantially contained, and it is more preferable that a compound having a molecular weight (in a case of having a molecular weight distribution, a weight-average molecular weight) of 1,000 or more is not substantially contained.

The fact that the high-molecular-weight compound is not substantially contained means that, for example, the content of the high-molecular-weight compound is 0.01% by mass or lower with respect to the curable composition for imprinting, and it is preferable that the content thereof is 0.005% by mass or lower and it is more preferable that the high-molecular-weight compound is not contained at all.

<Physical Property Value and the Like>

A viscosity of a composition obtained by removing the solvent from the curable composition for imprinting (that is, a composition prepared by mixing the components (solid content) other than the solvent in the curable composition for imprinting) is preferably 20.0 mPa·s or lower, more preferably 15.0 mPa·s or lower, still more preferably 11.0 mPa·s or lower, and even more preferably 9.0 mPa·s or lower. The lower limit value of the above-described viscosity is not particularly limited, but can be, for example, 5.0 mPa·s or greater. The viscosity can be measured by a known method, and for example, is measured according to the following method.

The viscosity is measured using an E-type rotational viscometer RE85L manufactured by TOKI SANGYO CO., LTD. and a standard cone rotor (1° 34'×$R^{24}$) in a state where a temperature of a sample cup is adjusted to 23° C. The unit is mPa·s. Other details regarding the measurement are in accordance with JIS Z 8803:2011. Two samples are produced for one level and are respectively measured three times. An arithmetic mean value of a total of six times is adopted as an evaluation value.

A surface tension (γResist) of the composition obtained by removing the solvent from the curable composition for imprinting is preferably 28.0 mN/m or greater and more preferably 30.0 mN/m or greater, and may be 32.0 mN/m or greater. By using the composition which has high surface tension, a capillary force is increased, and the composition can be filled into a mold pattern at high speed. The upper limit value of the surface tension is not particularly limited, but from the viewpoint of relation to the closely adhesive layer and of imparting ink jet suitability, is preferably 40.0 mN/m or lower and more preferably 38.0 mN/m or lower, and may be 36.0 mN/m or lower.

The surface tension of the composition obtained by removing the solvent from the curable composition for imprinting is measured at 23° C. using a surface tensiometer SURFACE TENS-IOMETER CBVP-A3 manufactured by Kyowa Interface Science Co., LTD. and a glass plate.

An Ohnishi parameter of the composition obtained by removing the solvent from the curable composition for imprinting is preferably 5.0 or less, more preferably 4.0 or less, and still more preferably 3.7 or less. The lower limit value of the Ohnishi parameter of the curable composition for imprinting is not particularly specified, but may be, for example, 1.0 or greater or further 2.0 or greater.

For the solid content of the curable composition for imprinting, the Ohnishi parameter can be determined by substituting the number of carbon atoms, the number of hydrogen atoms, and the number of oxygen atoms in all the constituent components into the following expression, respectively.

Ohnishi parameter=Sum of number of carbon atoms, number of hydrogen atoms, and number of oxygen atoms/(Number of carbon atoms−Number of oxygen atoms)

<Preservation Container>

As a storage container of the curable composition for imprinting according to the embodiment of the present invention, a storage container well known in the related art can be used. Moreover, as the storage container, for the purpose of suppressing impurities from being mixed into a raw material or a composition, a multilayer bottle having a container inner wall made of six layers of six kinds of resins or a bottle having a seven-layer structure of six kinds of resins is also preferably used. Examples of such a container include the container described in JP2015-123351A.

(Cured Substance and Imprint Pattern Producing Method)

The cured substance according to the embodiment of the present invention is a cured substance obtained by curing the curable composition for imprinting according to the embodiment of the present invention.

The cured substance according to the embodiment of the present invention is preferably a patterned cured substance (imprint pattern).

Hereinafter, an imprint pattern producing method will be described.

<Imprint Pattern Producing Method>

The imprint pattern producing method according to the embodiment of the present invention includes an applying step of applying the curable composition for imprinting according to the embodiment of the present invention onto a member to be applied, which is selected from the group consisting of a support and a mold;

- a contact step of contacting a member which is not selected as the member to be applied from the group consisting of the support and the mold with the curable composition for imprinting as a contact member;
- a curing step of forming the curable composition for imprinting into a cured substance; and
- a peeling step of peeling off the mold from the cured substance.

[Applying Step]

The imprint pattern producing method according to the embodiment of the present invention includes an applying step of applying the curable composition for imprinting according to the embodiment of the present invention to a member to be applied, which is selected from the group consisting of a support and a mold.

In the applying step, one member selected from the group consisting of the support and the mold is selected as the member to be applied, and the curable composition for imprinting according to the embodiment of the present invention is applied to the selected member to be applied.

Among the support and the mold, one is selected as the member to be applied and the other is a contact member.

That is, in the applying step, the curable composition for imprinting according to the embodiment of the present invention may be applied to the support and then brought into contact with the mold, or may be applied to the mold and then brought into contact with the support (may have a closely adhesive layer or the like described later).

—Support—

As the support, reference can be made to the description in paragraph 0103 of JP2010-109092A (the corresponding US application is the specification of US2011/0199592A), the contents of which are incorporated in the present specification. Specific examples thereof include a silicon substrate, a glass substrate, a sapphire substrate, a silicon carbide substrate, a gallium nitride substrate, a metal aluminum substrate, an amorphous aluminum oxide substrate, a polycrystalline aluminum oxide substrate, and a substrate made of GaAsP, GaP, AlGaAs, InGaN, GaN, AlGaN, ZnSe, AlGaInP, or ZnO. Furthermore, specific examples of a material for the glass substrate include aluminosilicate glass, aluminoborosilicate glass, and barium borosilicate glass. In the present invention, as the substrate, a silicon substrate is preferable.

It is preferable that the above-described support is a member including a closely adhesive layer on a surface on a side to which the curable composition for imprinting is applied.

The closely adhesive layer is preferably a closely adhesive layer formed by applying a composition for forming a closely adhesive layer, which will be described later, to the support.

Moreover, the above-described support may further include a liquid film described later on a surface of the closely adhesive layer opposite to the side in contact with the support.

The liquid film is preferably a liquid film formed by applying a composition for forming a liquid film, which will be described later, to the closely adhesive layer.

As the above-described closely adhesive layer, the closely adhesive layers described in paragraphs 0017 to 0068 of JP2014-024322A, paragraphs 0016 to 0044 of JP2013-093552A, JP2014-093385A, JP2013-202982A, and the like can be used, the contents of which are incorporated in the present specification.

—Mold—

In the present invention, the mold is not particularly limited. Regarding the mold, reference can be made to the description in paragraphs 0105 to 0109 of JP2010-109092A (the corresponding US application is the specification of US2011/0199592A), the contents of which are incorporated in the present specification. As the mold used in the present invention, a quartz mold is preferable. A pattern (line width) of the mold used in the present invention preferably has a size of 50 nm or less. The pattern of the mold can be formed according to a desired processing accuracy, for example, by photolithography, an electron beam drawing method, or the like, but in the present invention, a mold pattern producing method is not particularly limited.

Moreover, as the imprint pattern, a mold in which an imprint pattern including any shape of a line, a hole, or a pillar is formed is preferable.

Among them, a mold in which an imprint pattern including any shape of a line, a hole, or a pillar with a size of 100 nm or lower is formed is preferable.

—Application Method—

A method of applying the curable composition for imprinting according to the embodiment of the present invention to the member to be applied is not particularly specified, and generally well-known application methods can be adopted. Examples thereof include a dip coating method, an air knife coating method, a curtain coating method, a wire bar coating method, a gravure coating method, an extrusion coating method, a spin coating method, a slit scanning method, and an ink jet method.

Among them, preferred examples thereof include an ink jet method and a spin coating method.

Moreover, the curable composition for imprinting may be applied through multiple applying.

In a method of arranging liquid droplets by the ink jet method, a volume of the liquid droplets is preferably approximately 1 to 20 pL, and the liquid droplets are preferably arranged on the surface of the support at an interval between the liquid droplets. The interval between the liquid droplets may be appropriately set according to the volume of the liquid droplets, and is preferably an interval of 10 to 1,000 m. In a case of the ink jet method, the interval between liquid droplets is an arrangement interval between ink jet nozzles.

The ink jet method has an advantage that a loss of the curable composition for imprinting is small.

Specific examples of the method of applying the curable composition for imprinting by the ink jet method include the methods described in JP2015-179807A, WO2016/152597A, and the like, and the methods described in these documents can also be suitably used in the present invention.

On the other hand, the spin coating method has an advantage that the coating process is highly stable and the choice of materials which can be used is expanded.

Specific examples of the method of applying the curable composition for imprinting by the spin coating method include the methods described in JP2013-095833A, JP2015-071741A, and the like, and the methods described in these documents can also be suitably used in the present invention.

—Drying Step—

Moreover, the imprint pattern producing method according to the embodiment of the present invention may further include a drying step of drying the curable composition for imprinting according to the embodiment of the present invention applied in the applying step.

In particular, in a case where a composition including a solvent is used as the curable composition for imprinting according to the embodiment of the present invention, it is preferable that the imprint pattern producing method according to the embodiment of the present invention includes the drying step.

In the drying step, at least a part of the solvent included in the curable composition for imprinting according to the embodiment of the present invention applied is removed.

A drying method is not particularly limited, and drying by heating, drying by blowing air, or the like can be used without particular limitation, but drying by heating is preferable.

A heating unit is not particularly limited, and a well-known hot plate, oven, infrared heater, or the like can be used.

In the present invention, a layer formed from the curable composition for imprinting after the applying step and the drying step performed as necessary and before the contact step is also referred to as a "curable film".

[Contact Step]

The imprint pattern producing method according to the embodiment of the present invention includes a contact step of contacting a member which is not selected as the member to be applied from the group consisting of the support and the mold with the above-described curable composition for imprinting (curable film) as a contact member.

In a case where the support is selected as the member to be applied in the above-described applying step, in the contact step, the mold, which is the contact member, is brought into contact with the surface of the support to which the curable composition for imprinting according to the embodiment of the present invention is applied (surface on which the curable film is formed).

In a case where the mold is selected as the member to be applied in the above-described applying step, in the contact step, the support, which is the contact member, is brought into contact with the surface of the mold to which the curable composition for imprinting according to the embodiment of the present invention is applied (surface on which the curable film is formed).

That is, in the contact step, the curable composition for imprinting according to the embodiment of the present invention is present between the member to be applied and the contact member.

Details of the support and the mold are as described above.

In a case where the curable composition for imprinting according to the embodiment of the present invention (curable film) which is applied to the member to be applied is brought into contact with the contact member, a pressing pressure is preferably 1 MPa or lower. By setting the pressing pressure to 1 MPa or lower, the support or the mold is less likely to be deformed and thus the pattern accuracy tends to be improved. Moreover, also from the viewpoint that a device tends to be miniaturized due to low pressing force, the above-described range is preferable.

In addition, it is also preferable that the contact between the curable film and the contact member is performed under an atmosphere including a helium gas, a condensable gas, or both a helium gas and a condensable gas.

[Curing Step]

The imprint pattern producing method according to the embodiment of the present invention includes a curing step of forming a cured substance with the curable composition for imprinting.

The curing step is performed after the above-described contact step and before the above-described peeling step.

The method for producing a cured substance according to the embodiment of the present invention includes a step of curing the curable composition for imprinting, which is obtained by the method for producing the curable composition for imprinting according to the embodiment of the present invention. The above-described curing step can be performed by the same method as the curing step in the imprint pattern producing method according to the embodiment of the present invention. Moreover, the above-described cured substance is preferably a cured substance in which the mold has been peeled off by the peeling step described later.

Examples of a curing method include curing by heating and curing by exposure, which may be determined according to the type of the polymerization initiator included in the curable composition for imprinting, and curing by exposure is preferable.

For example, in a case where the above-described polymerization initiator is a photopolymerization initiator, the curable composition for imprinting can be cured by performing exposure in the curing step.

An exposure wavelength is not particularly limited, and may be determined according to the polymerization initiator. For example, ultraviolet light or the like can be used.

An exposure light source may be determined according to the exposure wavelength, and examples thereof include g-rays (wavelength: 436 nm), h-rays (wavelength: 405 nm), i-rays (wavelength: 365 nm), broadband light (light including at least two wavelengths of light selected from the group consisting of three wavelengths of g-rays, h-rays, and i-rays, and light having a wavelength shorter than that of i-rays; examples thereof include a high-pressure mercury lamp in a case where an optical filter is not used), semiconductor laser (wavelength: 830 nm, 532 nm, 488 nm, 405 nm, and the like), metal halide lamp, excimer laser, KrF excimer laser (wavelength: 248 nm), ArF excimer laser (wavelength: 193 nm), $F_2$ excimer laser (wavelength: 157 nm), extreme ultraviolet rays (EUV; wavelength: 13.6 nm), and electron beam.

Among them, preferred examples thereof include exposure using i-rays or broadband light.

An irradiation amount (exposure amount) during the exposure may be sufficiently larger than the minimum irradiation amount required for curing the curable composition for imprinting. The irradiation amount required for curing the curable composition for imprinting can be appropriately determined by examining consumption or the like of an unsaturated bond of the curable composition for imprinting.

The exposure amount is, for example, preferably in a range of 5 to 1,000 $mJ/cm^2$ and more preferably in a range of 10 to 500 $mJ/cm^2$.

An exposure illuminance is not particularly limited and may be selected depending on a relationship with the light source, but is preferably in a range of 1 to 500 $mW/cm^2$ and more preferably in a range of 10 to 400 $mW/cm^2$.

An exposure time is not particularly limited and may be determined in consideration of the exposure illuminance according to the exposure amount, but is preferably 0.01 to 10 seconds and more preferably 0.5 to 1 second.

A temperature of the support during the exposure is usually room temperature, but in order to increase reactivity, the exposure may be performed while heating. Since setting a vacuum state as a stage prior to the exposure is effective in preventing air bubbles from being mixed, suppressing a decrease in reactivity due to oxygen mixing, and improving adhesiveness between the mold and the curable composition for imprinting, the light irradiation may be performed in a vacuum state. Moreover, a preferred degree of vacuum during the exposure is in a range of $10^{-1}$ Pa to normal pressure.

After the exposure, as necessary, the curable composition for imprinting after the exposure may be heated. A heating temperature is preferably 150° C. to 280° C. and more preferably 200° C. to 250° C. Moreover, a heating time is preferably 5 to 60 minutes and more preferably 15 to 45 minutes.

In addition, in the curing step, only the heating step may be performed without exposure. For example, in a case where the above-described polymerization initiator is a thermal polymerization initiator, the curable composition for imprinting can be cured by performing heating in the curing step. A preferred aspect of the heating temperature and heating time in this case is the same as in the heating temperature and heating time in the case of heating after the above-described exposure.

A heating unit is not particularly limited, and examples thereof include the same heating unit as in the heating of the above-described drying step.

[Peeling Step]

The imprint pattern producing method according to the embodiment of the present invention includes a peeling step of peeling off the cured substance from the mold.

By the peeling step, the cured substance obtained in the curing step is peeled off from the mold, and a cured substance in a patterned shape (also referred to as a "cured substance pattern") to which the pattern of the mold is transferred can be obtained. The obtained cured substance pattern can be used for various uses as described later. In the present invention, the imprint pattern producing method is particularly advantageous in that a fine cured substance pattern of a nano-order can be formed, and a cured substance pattern having a size of 50 nm or lower and particularly 30 nm or lower can also be formed. The lower limit value of the size of the above-described cured substance pattern is not particularly specified, but can be, for example, 1 nm or greater.

A peeling method is not particularly limited, and for example, the peeling can be performed by using a mechanical peeling device or the like known in the imprint pattern producing method.

(Device, Method for Manufacturing Device, and Application of Cured Substance Pattern)

The device according to the embodiment of the present invention includes the cured substance according to the embodiment of the present invention. In addition, the device according to the embodiment of the present invention can be obtained, for example, by the following method for manufacturing a device according to the embodiment of the present invention.

The method for manufacturing a device according to the embodiment of the present invention includes the imprint pattern producing method according to the embodiment of the present invention.

Specifically, a pattern (cured substance pattern) formed by the imprint pattern producing method according to the embodiment of the present invention can be used in a method for manufacturing a device such as a permanent film used in a liquid crystal display device (LCD) or the like, or an etching resist (mask for lithography) for manufacturing a semiconductor element.

In particular, the present invention describes a method for manufacturing a circuit board, which includes a step of obtaining a pattern (cured substance pattern) by the imprint pattern producing method according to the embodiment of the present invention, and a method for manufacturing a device including the circuit board. The method for manufacturing a circuit board according to the preferred embodiment of the present invention may further include a step of performing etching or ion implantation on the substrate using the pattern (cured substance pattern) obtained by the above-described pattern forming method as a mask and a step of forming an electronic member. The above-described circuit board is preferably a semiconductor element. That is, the present invention describes a method for manufacturing a semiconductor device, including the imprint pattern producing method according to the embodiment of the present invention. Further, the present invention describes a method for manufacturing a device, which includes a step of obtaining a circuit board by the above-described method for manufacturing a circuit board and a step of connecting the circuit board and a control mechanism which controls the circuit board.

Moreover, by forming a grid pattern on a glass substrate of a liquid crystal display device using the imprint pattern producing method according to the embodiment of the present invention, a polarizing plate having low reflection or absorption and a large screen size (for example, 55 inches, or greater than 60 inches) can be manufactured at a low cost. That is, the present invention describes a method for manufacturing a polarizing plate and a method for manufacturing a device including the polarizing plate, which include the imprint pattern producing method according to the embodiment of the present invention. For example, the polarizing plate described in JP2015-132825A or WO2011/132649A can be manufactured. Furthermore, 1 inch is 25.4 mm.

The pattern (cured substance pattern) manufactured by the imprint pattern producing method according to the embodiment of the present invention is also useful as an etching resist (mask for lithography). That is, the present invention describes a method for manufacturing a device in which the obtained cured substance pattern is used as an etching resist, including the imprint pattern producing method according to the embodiment of the present invention.

In a case where the cured substance pattern is used as an etching resist, examples thereof include an aspect in which, first, a pattern (cured substance pattern) is formed by applying the imprint pattern producing method according to the embodiment of the present invention on the support, and the obtained cured substance pattern is used as an etching mask to etch the support. By performing etching with an etching gas such as hydrogen fluoride or the like in a case of wet etching and $CF_4$ or the like in a case of dry etching, a pattern can be formed on the support along the shape of the desired cured substance pattern.

Moreover, the pattern (cured substance pattern) produced by the imprint pattern producing method according to the embodiment of the present invention can be also preferably used for producing a recording medium such as a magnetic disc, a light-receiving element such as a solid-state imaging element, a light emitting element such as a light emitting diode (LED) and organic electroluminescence (organic EL), an optical device such as a liquid crystal display device (LCD), an optical component such as a diffraction grating, a relief hologram, an optical waveguide, an optical filter, and a microlens array, a member for flat panel display such as a thin film transistor, an organic transistor, a color filter, an antireflection film, a polarizing plate, a polarizing element, an optical film, and a column material, a nanobiodevice, an immunoassay chip, a deoxyribonucleic acid (DNA) separation chip, a microreactor, a photonic liquid crystal, or a guide pattern for fine pattern formation (directed self-assembly, DSA) using self-assembly of block copolymers.

That is, the present invention describes a method for manufacturing these device, including the imprint pattern producing method according to the embodiment of the present invention.

<Composition for Forming Closely Adhesive Layer>

As described above, by providing the closely adhesive layer between the support and the curable composition for imprinting, effects such as improvement in adhesiveness between the support and a curable composition layer for imprinting can be achieved. In the present invention, the closely adhesive layer can be obtained by applying the composition for forming a closely adhesive layer to the support and then curing the composition, in the same manner as the curable composition for imprinting. Hereinafter, each component of the composition for forming a closely adhesive layer will be described.

The composition for forming a closely adhesive layer includes a curable component. The curable component is a component constituting the closely adhesive layer, and may be any one of a high-molecular-weight component (for example, a molecular weight is more than 1,000) or a low-molecular-weight component (for example, a molecular weight is less than 1,000). Specific examples thereof include a resin and a crosslinking agent. Each of these components may be used alone or in combination of two or more kinds thereof.

A total content of the curable components in the composition for forming a closely adhesive layer is not particularly limited, but is preferably 50% by mass or greater in the total solid content, more preferably 70% by mass or greater in the total solid content, and still more preferably 80% by mass or greater in the total solid content. The upper limit thereof is not particularly limited, but is preferably 99.9% by mass or lower.

A concentration of the curable component in the composition for forming a closely adhesive layer (including a solvent) is not particularly limited, but is preferably 0.01% by mass or greater, more preferably 0.05% by mass or greater, and still more preferably 0.1% by mass or greater. The upper limit thereof is preferably 10% by mass or lower, more preferably 5% by mass or lower, still more preferably 1% by mass or lower, and even more preferably lower than 1% by mass.

[Resin]

As the resin in the composition for forming a closely adhesive layer, a well-known resin can be widely used. The resin used in the present invention preferably has at least one of a radically polymerizable group or a polar group, and more preferably has both a radically polymerizable group and a polar group.

By having the radically polymerizable group, a closely adhesive layer having excellent hardness can be obtained. Moreover, by having the polar group, adhesiveness to the support is improved. Furthermore, in a case where a crosslinking agent is formulated, a crosslinking structure formed after curing is further firmed, and thus hardness of the obtained closely adhesive layer can be improved.

The radically polymerizable group preferably includes an ethylenically unsaturated bond-containing group. Examples of the ethylenically unsaturated bond-containing group include a (meth)acryloyl group (preferably a (meth)acryloyloxy group and a (meth)acryloylamino group), a vinyl group, a vinyloxy group, an allyl group, a methylallyl group, a propenyl group, a butenyl group, a vinylphenyl group, and a cyclohexenyl group, and a (meth)acryloyl group or a vinyl group is preferable, a (meth)acryloyl group is more preferable, and a (meth)acryloyloxy group is still more preferable. The ethylenically unsaturated bond-containing group defined here is referred to as Et.

Furthermore, the polar group is preferably at least one kind of an acyloxy group, a carbamoyloxy group, a sulfonyloxy group, an acyl group, an alkoxycarbonyl group, an acylamino group, a carbamoyl group, an alkoxycarbonylamino group, a sulfonamide group, a phosphoric acid group, a carboxy group, or a hydroxy group, more preferably at least one kind of an alcoholic hydroxy group, a phenolic hydroxy group, or a carboxy group, and still more preferably an alcoholic hydroxy group or a carboxy group. The polar group defined here is referred to as a polar group Po. The polar group is preferably a nonionic group.

The resin in the composition for forming a closely adhesive layer may further include a cyclic ether group. Examples of the cyclic ether group include an epoxy group and an oxetanyl group, and an epoxy group is preferable. The cyclic ether group defined here is referred to as a cyclic ether group Cyt.

Examples of the resin include a (meth)acrylic resin, a vinyl resin, a novolac resin, a phenol resin, a melamine resin, a urea resin, an epoxy resin, and a polyimide resin, and at least one kind of a (meth)acrylic resin, a vinyl resin, or a novolac resin is preferable.

A weight-average molecular weight of the resin is preferably 4,000 or more, more preferably 6,000 or more, and still more preferably 8,000 or more. The upper limit thereof is preferably 1,000,000 or less and may be 500,000 or less.

The resin preferably has at least one of constitutional units represented by Formulae (1) to (3).

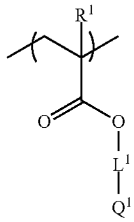

(1)

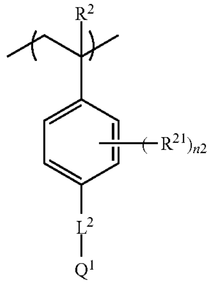

(2)

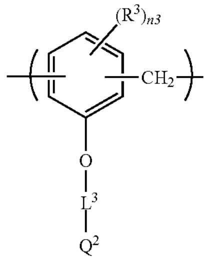

(3)

In the formulae, $R^1$ and $R^2$ are each independently a hydrogen atom or a methyl group. $R^{21}$ and $R^3$ are each independently a substituent. $L^1$, $L^2$, and $L^3$ are each independently a single bond or a linking group. n2 is an integer of 0 to 4. n3 is an integer of 0 to 3. $Q^1$ is an ethylenically unsaturated bond-containing group or a cyclic ether group. $Q^2$ is an ethylenically unsaturated bond-containing group, a cyclic ether group, or a polar group.

$R^1$ and $R^2$ are each preferably a methyl group.

$R^{21}$ and $R^3$ are each independently preferably the substituent.

In a case where there is a plurality of $R^{21}$'s, $R^{21}$'s may be linked to each other to form a cyclic structure. In the present specification, the linking is meant to include not only an aspect in which groups are continued by bonding but also an aspect in which groups lose some atoms and are fused (condensed). Moreover, unless otherwise specified, an oxygen atom, a sulfur atom, and a nitrogen atom (amino group) may be included in the linking cyclic structure. Examples of the formed cyclic structure include an aliphatic hydrocarbon ring (groups exemplified below are referred to as a ring Cf) (for example, a cyclopropyl group, a cyclobutyl group, a cyclopentyl group, a cyclohexyl group, a cyclopropenyl group, a cyclobutenyl group, a cyclopentenyl group, a cyclohexenyl group, and the like), an aromatic hydrocarbon ring (rings exemplified below are referred to as a ring Cr) (a benzene ring, a naphthalene ring, an anthracene ring, a phenanthrene ring, and the like), a nitrogen-containing heterocycle (rings exemplified below are referred to as a ring Cn) (for example, a pyrrole ring, an imidazole ring, a pyrazole ring, a pyridine ring, a pyrroline ring, a pyrrolidine ring, an imidazolidine ring, a pyrazolidine ring, a piperidine ring, a piperazine ring, a morpholine ring, and the like), an oxygen-containing heterocycle (rings exemplified below are referred to as a ring Co) (a furan ring, a pyran ring, an oxirane ring, an oxetane ring, a tetrahydrofuran ring, a tetrahydropyran ring, a dioxane ring, and the like), and a sulfur-containing heterocycle (rings exemplified below are referred to as a ring Cs) (a thiophene ring, a thiirane ring, a thietane ring, a tetrahydrothiophene ring, a tetrahydrothiopyran ring, and the like).

In a case where there is a plurality of $R^3$'s, $R^3$'s may be linked to each other to form a cyclic structure. Examples of the formed cyclic structure include ring Cf, the ring Cr, the ring Cn, the ring Co, and the ring Cs.

It is preferable that $L^1$, $L^2$, and $L^3$ are each independently a single bond or a linking group L which will be described later. Among them, a single bond, or an alkylene group or an (oligo)alkyleneoxy group, which is defined as the linking group L, is preferable, and an alkylene group is more preferable. The linking group L preferably has the polar group Po as a substituent. Moreover, an aspect in which the alkylene group has a hydroxy group as a substituent is also preferable. In the present specification, the "(oligo)alkyleneoxy group" means a divalent linking group having one or more "alkyleneoxy" constitutional units. The number of carbon atoms in an alkylene chain in the constitutional unit may be the same or different for every constitutional unit.

n2 is preferably 0 or 1 and more preferably 0. n3 is preferably 0 or 1 and more preferably 0.

$Q^1$ is preferably the ethylenically unsaturated bond-containing group Et.

$Q^2$ is preferably a polar group, and preferably an alkyl group having an alcoholic hydroxy group.

The above-described resin may further include at least one of a constitutional unit (11), a constitutional unit (21), or a constitutional unit (31). In particular, in the resin included in the present invention, the constitutional unit (11) is preferably combined with the constitutional unit (1), the constitutional unit (21) is preferably combined with the constitutional unit (2), and the constitutional unit (31) is preferably combined with the constitutional unit (3).

(11)

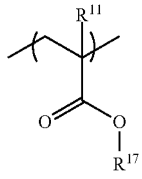

(21)

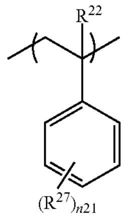

(31)

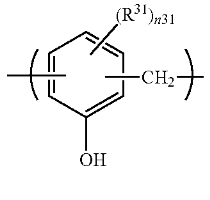

In the formulae, $R^{11}$ and $R^{22}$ are each independently a hydrogen atom or a methyl group. $R^{17}$ is a substituent. $R^{27}$ is a substituent. n21 is an integer of 0 to 5. $R^{31}$ is a substituent, and n31 is an integer of 0 to 3.

$R^{11}$ and $R^{22}$ are each preferably a methyl group.

$R^{17}$ is preferably a group containing a polar group or a group containing a cyclic ether group. In a case where $R^{17}$ is a group containing a polar group, $R^{17}$ is preferably a group containing the above-described polar group Po, and more preferably the above-described polar group Po or the substituent substituted with the above-described polar group Po. In a case where $R^{17}$ is a group containing a cyclic ether group, $R^{17}$ is preferably a group containing the above-described cyclic ether group Cyt, and more preferably the substituent substituted with the above-described cyclic ether group Cyt.

$R^{27}$ is a known substituent, and at least one of $R^{27}$'s is preferably a polar group. n21 is preferably 0 or 1 and more preferably 0. In a case where there is a plurality of $R^{27}$'s, $R^{27}$'s may be linked to each other to form a cyclic structure. Examples of the formed cyclic structure include examples of the ring Cf, the ring Cr, the ring Cn, the ring Co, and the ring Cs.

$R^{31}$ is preferably a known substituent. n31 is an integer of 0 to 3, preferably 0 or 1, and more preferably 0. In a case where there is a plurality of $R^{31}$'s, $R^{31}$'s may be linked to each other to form a cyclic structure. Examples of the formed cyclic structure include examples of the ring Cf, the ring Cr, the ring Cn, the ring Co, and the ring Cs.

Examples of the linking group L include an alkylene group (the number of carbon atoms is preferably 1 to 24, more preferably 1 to 12, and still more preferably 1 to 6), an alkenylene group (the number of carbon atoms is preferably 2 to 12, more preferably 2 to 6, and still more preferably 2 or 3), an (oligo)alkyleneoxy group (the number of carbon atoms in an alkylene group in one constitutional unit is preferably 1 to 12, more preferably 1 to 6, and still more preferably 1 to 3; and the repetition number is preferably 1 to 50, more preferably 1 to 40, and still more preferably 1 to 30), an arylene group (the number of carbon atoms is preferably 6 to 22, more preferably 6 to 18, and still more preferably 6 to 10), an oxygen atom, a sulfur atom, a sulfonyl group, a carbonyl group, a thiocarbonyl group, $-NR^N-$, and a linking group related to a combination thereof. The alkylene group, alkenylene group, and alkyleneoxy group may have a substituent. For example, the alkylene group may have a hydroxy group.

A linking chain length of the linking group L is preferably 1 to 24, more preferably 1 to 12, and still more preferably 1 to 6. The linking chain length means the number of atoms positioned on the shortest path among the atomic groups involved in the linkage. For example, in a case of $-CH_2-(C{=}O)-O-$, the linking chain length is 3.

Furthermore, the alkylene group, alkenylene group, and (oligo)alkyleneoxy group, which are defined as the linking group L, may be chain-like or cyclic, or may be linear or branched.

It is preferable that, as an atom constituting the linking group L, a carbon atom, a hydrogen atom, and as necessary, a heteroatom (at least one kind selected from an oxygen atom, a nitrogen atom, or a sulfur atom, and the like) are included. The number of carbon atoms in the linking group is preferably 1 to 24, more preferably 1 to 12, and still more preferably 1 to 6. The number of hydrogen atom may be determined according to the number of carbon atoms and the like. In a case of the number of heteroatoms, the numbers of the oxygen atoms, the nitrogen atoms, and the sulfur atoms are each independently preferably 0 to 12, more preferably 0 to 6, and still more preferably 0 to 3.

The resin may be synthesized by a conventional method. For example, a resin having the constitutional unit represented by Formula (1) can be appropriately synthesized by a well-known method for addition polymerization of olefin. A resin having the constitutional unit represented by Formula (2) can be appropriately synthesized by a well-known method for addition polymerization of styrene. A resin having the constitutional unit represented by Formula (3) can be appropriately synthesized by a well-known method for synthesis of a phenol resin.

The resin may be used alone or in combination of a plurality thereof.

As the resin as the curable component, in addition to the above-described resins, the resins described in paragraphs 0016 to 0079 of WO2016/152600A, paragraphs 0025 to 0078 of WO2016/148095A, paragraphs 0015 to 0077 of WO2016/031879A, and paragraphs 0015 to 0057 of WO2016/027843A can be used, the contents of which are incorporated in the present specification.

[Crosslinking Agent]

The crosslinking agent in the composition for forming a closely adhesive layer is not particularly limited as long as the crosslinking agent advances curing by a crosslinking reaction. In the present invention, the crosslinking agent is preferably reacted with a polar group of a resin to form a crosslinking structure. By using such a crosslinking agent, the resin is more firmly bonded, and thus a firmer film can be obtained.

Examples of the crosslinking agent include an epoxy compound (compound having an epoxy group), an oxetanyl compound (compound having an oxetanyl group), an alkoxymethyl compound (compound having an alkoxymethyl group), a methylol compound (compound having a methylol group), and a blocked isocyanate compound (compound having a blocked isocyanate group), and an alkoxymethyl compound (compound having an alkoxymethyl group) can form a firm bond at a low temperature and thus is preferable.

[Other Components]

The composition for forming a closely adhesive layer may include other components in addition to the above-described components.

Specifically, one kind or two or more kinds of a solvent, a thermal acid generator, an alkylene glycol compound, a polymerization initiator, a polymerization inhibitor, an antioxidant, a leveling agent, a thickener, a surfactant, or the like may be included. Regarding the above-described components, the respective components described in JP2013-036027A, JP2014-090133A, and JP2013-189537A can be used. Also regarding the content or the like, reference can be made to the description in the above-described publications.

—Solvent—

In the present invention, the composition for forming a closely adhesive layer particularly preferably contains a solvent (hereinafter, also referred to as a "solvent for a closely adhesive layer"). The solvent is, for example, preferably a compound which is liquid at 23° C. and has a boiling point of 250° C. or lower. A content of the solvent for a closely adhesive layer in the composition for forming a closely adhesive layer is preferably 99.0% by mass or greater and more preferably 99.2% by mass or greater, and may be 99.4% by mass or greater. That is, the concentration of the total solid content in the composition for forming a closely adhesive layer is preferably 1% by mass or lower, more preferably 0.8% by mass or lower, and still more preferably 0.6% by mass or lower. Moreover, the lower limit value thereof is preferably greater than 0% by mass, more preferably 0.001% by mass or greater, still more preferably 0.01% by mass or greater, and even more preferably 0.1% by mass or greater. By setting the proportion of the solvent within the above-described range, a film thickness during film formation is kept thin, and thus pattern formability during etching processing tends to be improved.

Only one kind or two or more kinds of the solvents may be contained in the composition for forming a closely adhesive layer. In a case where two or more kinds thereof are contained, the total amount thereof is preferably within the above-described range.

A boiling point of the solvent for a closely adhesive layer is preferably 230° C. or lower, more preferably 200° C. or lower, still more preferably 180° C. or lower, even more preferably 160° C. or lower, and even still more preferably 130° C. or lower. The lower limit value thereof is preferably 23° C. or higher and more preferably 60° C. or higher. By setting the boiling point within the above-described range, the solvent can be easily removed from the closely adhesive layer, which is preferable.

The solvent for a closely adhesive layer is preferably an organic solvent. The solvent is preferably a solvent having any one or more of an ester group, a carbonyl group, a hydroxy group, or an ether group. Among them, it is preferable to use an aprotic polar solvent.

Examples of a preferred solvent among the solvents for a closely adhesive layer include alkoxy alcohol, propylene glycol monoalkyl ether carboxylate, propylene glycol monoalkyl ether, lactic acid ester, acetic acid ester, alkoxypropionic acid ester, chain-like ketone, cyclic ketone, lactone, and alkylene carbonate, and propylene glycol monoalkyl ether and lactone are particularly preferable.

<Composition for Forming Liquid Film>

In addition, in the present invention, it is also preferable that a liquid film is formed on the closely adhesive layer by using a composition for forming a liquid film containing a radically polymerizable compound which is a liquid at 23° C. and 1 atm. In the present invention, the liquid film can be obtained by applying the composition for forming a liquid film onto the support and then drying the composition, in the same manner as the curable composition for imprinting. By forming such a liquid film, there are effects that the adhesiveness between the support and the curable composition for imprinting is further improved, and that the wettability of the curable composition for imprinting on the support is also improved. Hereinafter, the composition for forming a liquid film will be described.

The viscosity of the composition for forming a liquid film is preferably 1,000 mPa·s or lower, more preferably 800 mPa·s or lower, still more preferably 500 mPa·s or lower, and even more preferably 100 mPa·s or lower. The lower limit value of the viscosity is not particularly limited, but can be, for example, 1 mPa·s or greater. The viscosity is measured according to the following method.

The viscosity is measured using an E-type rotational viscometer RE85L manufactured by TOKI SANGYO CO., LTD. and a standard cone rotor (1° 34'×$R^{24}$) in a state where a temperature of a sample cup is adjusted to 23° C. The unit is mPa·s. Other details regarding the measurement are in accordance with JIS Z 8803:2011. Two samples are produced for one level and are respectively measured three times. An arithmetic mean value of a total of six times is adopted as an evaluation value.

[Radically Polymerizable Compound A]

The composition for forming a liquid film contains a radically polymerizable compound (radically polymerizable compound A) which is a liquid at 23° C. and 1 atm.

A viscosity of the radically polymerizable compound A at 23° C. is preferably 1 to 100,000 mPa·s. The lower limit thereof is preferably 5 mPa·s or greater and more preferably 11 mPa·s or greater. The upper limit thereof is preferably 1,000 mPa·s or lower and more preferably 600 mPa·s or lower.

The radically polymerizable compound A may be a monofunctional radically polymerizable compound having only one radically polymerizable group in one molecule, or a polyfunctional radically polymerizable compound having two or more radically polymerizable groups in one molecule. The monofunctional radically polymerizable compound and the polyfunctional radically polymerizable compound may be used in combination. Among them, for a reason of suppressing pattern collapse, the radically polymerizable compound A contained in the composition for forming a liquid film preferably includes a polyfunctional radically polymerizable compound, more preferably includes a radically polymerizable compound having two to five radically polymerizable groups in one molecule, still more preferably includes a radically polymerizable compound having two to four radically polymerizable groups in one molecule, and particularly preferably includes a radically polymerizable compound having two radically polymerizable groups in one molecule.

Furthermore, the radically polymerizable compound A preferably contains at least one of an aromatic ring (the number of carbon atoms is preferably 6 to 22, more preferably 6 to 18, and still more preferably 6 to 10) or an alicyclic ring (the number of carbon atoms is preferably 3 to 24, more preferably 3 to 18, and still more preferably 3 to 6), and more preferably contains an aromatic ring. The aromatic ring is preferably a benzene ring. Moreover, a molecular weight of the radically polymerizable compound A is preferably 100 to 900.

Examples of the radically polymerizable group of the radically polymerizable compound A include ethylenically unsaturated bond-containing groups, such as a vinyl group, an allyl group, and a (meth)acryloyl group, and a (meth) acryloyl group is preferable.

It is also preferable that the radically polymerizable compound A is a compound represented by Formula (I-1).

(I-1)

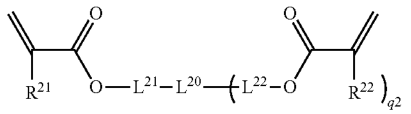

$L^{20}$ is a (1+q2)-valent linking group, and examples thereof include (1+q2)-valent linking groups which contain a group (the number of carbon atoms is preferably 1 to 12, more preferably 1 to 6, and still more preferably 1 to 3) having an alkane structure, a group (the number of carbon atoms is preferably 2 to 12, more preferably 2 to 6, and still more preferably 2 or 3) having an alkene structure, a group (the number of carbon atoms is preferably 6 to 22, more preferably 6 to 18, and still more preferably 6 to 10) having an aryl structure, a group (the number of carbon atoms is preferably 1 to 22, more preferably 1 to 18, and still more preferably 1 to 10, examples of a heteroatom include a nitrogen atom, a sulfur atom, and an oxygen atom, and a 5-membered ring, a 6-membered ring, or a 7-membered ring are preferable) having a heteroaryl structure, or a group obtained by combining these groups. Examples of the group in which two aryl groups are combined include groups having a structure such as biphenyl, diphenylalkane, biphenylene, and indene. Examples of a combination of the group having a heteroaryl structure and the group having an aryl structure include groups having a structure such as indole, benzimidazole, quinoxaline, and carbazole.

$L^{20}$ is preferably a linking group including at least one kind selected from a group having an aryl structure or a group having a heteroaryl structure, and more preferably a linking group including a group having an aryl structure.

$R^{21}$ and $R^{22}$ each independently represent a hydrogen atom or a methyl group.

$L^{21}$ and $L^{22}$ each independently represent a single bond or the linking group L, and a single bond or an alkylene group is preferable.

$L^{20}$ and $L^{21}$ or $L^{22}$ may be bonded to each other through or without the linking group L to form a ring. $L^{20}$, $L^{21}$, and $L^{22}$ may have a substituent. A plurality of substituents may be bonded to each other to form a ring. In a case where there are the plurality of substituents, the plurality of substituents may be the same as or different from each other.

q2 is an integer of 0 to 5, preferably an integer of 0 to 3, more preferably an integer of 0 to 2, still more preferably 0 or 1, and particularly preferably 1.

As the radically polymerizable compound A, the compounds described in paragraphs 0017 to 0024 and Examples of JP2014-090133A, the compounds described in paragraphs 0024 to 0089 of JP2015-009171A, the compounds described in paragraphs 0023 to 0037 of JP2015-070145A, and the compounds described in paragraphs 0012 to 0039 of WO2016/152597A can also be used.

A content of the radically polymerizable compound A in the composition for forming a liquid film is preferably 0.01% by mass or greater, more preferably 0.05% by mass or greater, and still more preferably 0.1% by mass or greater. The upper limit thereof is preferably 10% by mass or lower, more preferably 5% by mass or lower, and still more preferably 1% by mass or lower.

The content of the radically polymerizable compound A in the solid content of the composition for forming a liquid film is preferably 50% by mass or greater, more preferably 75% by mass or greater, and still more preferably 90% by mass or greater. The upper limit thereof may be 100% by mass. The radically polymerizable compound A may be used alone or in combination of two or more kinds thereof. In a case where two or more kinds thereof are used, the total amount thereof is preferably within the above-described range.

Furthermore, it is also preferable that the solid content of the composition for forming a liquid film substantially consists of the radically polymerizable compound A. The case where the solid content of the composition for forming a liquid film substantially consists of the radically polymerizable compound A means that the content of the radically polymerizable compound A in the solid content of the composition for forming a liquid film is 99.9% by mass or greater, the content is more preferably 99.99% by mass or greater, and it is still more preferable that the solid content consists of the radically polymerizable compound A.

[Solvent]

The composition for forming a liquid film preferably contains a solvent (hereinafter, referred to as a "solvent for a liquid film" in some cases). Examples of the solvent for a liquid film include the solvents described in the above-described section of the solvent for a closely adhesive layer, and these solvents can be used. A content of the solvent for a liquid film in the composition for forming a liquid film is preferably 90% by mass or greater and more preferably 99% by mass or greater, and may be 99.99% by mass or greater.

A boiling point of the solvent for a liquid film is preferably 230° C. or lower, more preferably 200° C. or lower, still more preferably 180° C. or lower, even more preferably 160° C. or lower, and even still more preferably 130° C. or lower. The lower limit value thereof is preferably 23° C. or higher and more preferably 60° C. or higher. By setting the boiling point within the above-described range, the solvent can be easily removed from the liquid film, which is preferable.

[Radical Polymerization Initiator]

The composition for forming a liquid film may contain a radical polymerization initiator. Examples of the radical polymerization initiator include a thermal radical polymerization initiator and a photoradical polymerization initiator, and a photoradical polymerization initiator is preferable. As a photoradical polymerization initiator, well-known compounds can be optionally used. Examples thereof include a halogenated hydrocarbon derivative (for example, a compound having a triazine skeleton, a compound having an oxadiazole skeleton, a compound having a trihalomethyl group, and the like), an acylphosphine compound, a hexaarylbiimidazole compound, an oxime compound, an organic peroxide, a thio compound, a ketone compound, an aromatic onium salt, an acetophenone compound, an azo compound, an azide compound, a metallocene compound, an organic boron compound, and an iron arene complex. For the details thereof, reference can be made to the description in paragraphs 0165 to 0182 of JP2016-027357A, the contents of which are incorporated in the present specification. Among them, an acetophenone compound, an acylphosphine compound, or an oxime compound is preferable. Examples of a commercially available product thereof include IRGACURE-OXE01, IRGACURE-OXE02, IRGACURE-127, IRGACURE-819, IRGACURE-379, IRGACURE-369, IRGACURE-754, IRGACURE-1800, IRGACURE-651, IRGACURE-907, IRGACURE-TPO, and IRGACURE-1173 (all manufactured by BASF SE), and Omnirad 184, Omnirad TPO H, Omnirad 819, and Omnirad 1173 (all manufactured by IGM Resins B.V.).

In a case where the radical polymerization initiator is contained, the content thereof with respect to the solid content of the composition for forming a liquid film is preferably 0.1% to 10% by mass, more preferably 1% to 8% by mass, and still more preferably 2% to 5% by mass. In a case where two or more kinds of the radical polymerization initiators are used, the total amount thereof is preferably within the above-described range.

[Other Components]

The composition for forming a liquid film may include one kind or two or more kinds of a polymerization inhibitor, an antioxidant, a leveling agent, a thickener, a surfactant, or the like, in addition to the above-described components.

EXAMPLES

Hereinafter, the present invention will be described in more detail with reference to Examples. The materials, the used amounts, the proportions, the treatment details, the treatment procedures, and the like shown in the following Examples can be appropriately modified without departing from the spirit of the present invention. Therefore, the scope of the present invention is not limited to the specific examples described below. In Examples, unless otherwise specified, "parts" and "%" are based on mass, and an environmental temperature (room temperature) in each step is 23° C.

<Preparation of Curable Composition for Imprinting>

In each Example and Comparative Example, various compounds listed in the following tables were mixed to prepare a curable composition for imprinting or a comparative composition. Moreover, in each composition, a component described as "-" was not added. The composition was filtered through a 0.02 μm Nylon filter and a 0.001 μm UPE filter to prepare a curable composition for imprinting and a comparative composition.

TABLE 1

| | | | Example 1 | Comparative Example 1 | Example 2 | Example 3 | Example 4 | Example 5 | Example 6 | Example 7 | Example 8 |
|---|---|---|---|---|---|---|---|---|---|---|---|
| Composition | Polymerizable compound | M-1 | 60 | 60 | 60 | 60 | 60 | 60 | 60 | 60 | 60 |
| | | M-2 | — | — | — | — | — | — | — | — | — |
| | | M-3 | — | — | — | — | — | — | — | — | — |
| | | M-4 | — | — | — | — | — | — | — | — | — |
| | | M-5 | — | — | — | — | — | — | — | — | — |
| | | M-6 | — | — | — | — | — | — | — | — | — |
| | | M-7 | — | — | — | — | — | — | — | — | — |
| | | M-8 | — | — | — | — | — | — | — | — | — |
| | | M-9 | — | — | — | — | — | — | — | — | — |
| | | M-10 | — | — | — | — | — | — | — | — | — |
| | | M-11 | — | — | — | — | — | — | — | — | — |
| | | M-12 | — | — | — | — | — | — | — | — | — |
| | | M-13 | — | — | — | — | — | — | — | — | — |
| | | M-14 | — | — | — | — | — | — | — | — | — |
| | | M-15 | 35 | 35 | 35 | 35 | 35 | 35 | 35 | 35 | 35 |
| | | M-16 | — | — | — | — | — | — | — | — | — |
| | | M-17 | — | — | — | — | — | — | — | — | — |
| | | Silicone polymer 1 | — | — | — | — | — | — | — | — | — |
| | Polymerization initiator | Omnirad TPO H | 3.9 | 3.9 | 3.9 | 3.9 | 3.9 | 3.9 | 3.9 | — | — |
| | | Omnirad 819 | — | — | — | — | — | — | — | — | — |
| | | I-1 | — | — | — | — | — | — | — | — | — |
| | | I-2 | — | — | — | — | — | — | — | — | — |

TABLE 1-continued

| | | Example 1 | Comparative Example 1 | Example 2 | Example 3 | Example 4 | Example 5 | Example 6 | Example 7 | Example 8 |
|---|---|---|---|---|---|---|---|---|---|---|
| | Irgacure OXE02 | — | — | — | — | — | — | — | 3.9 | 2 |
| | Omnirad 1173 | — | — | — | — | — | — | — | — | — |
| | Omnirad 2959 | — | — | — | — | — | — | — | — | — |
| | Omnirad MBF | — | — | — | — | — | — | — | — | 1.9 |
| Specific compound | G-1 | 0.1 | — | — | — | — | — | — | — | 0.1 |
| | H-1 | — | 0.1 | — | — | — | — | — | — | — |
| | G-2 | — | — | 0.1 | — | — | — | — | — | — |
| | G-3 | — | — | — | 0.1 | — | — | — | — | — |
| | G-4 | — | — | — | — | 0.1 | — | — | — | — |
| | G-5 | — | — | — | — | — | 0.1 | — | — | — |
| | G-6 | — | — | — | — | — | — | 0.1 | — | — |
| | G-7 | — | — | — | — | — | — | — | 0.1 | — |
| | G-8 | — | — | — | — | — | — | — | — | — |
| | G-9 | — | — | — | — | — | — | — | — | — |
| | G-10 | — | — | — | — | — | — | — | — | — |
| | G-11 | — | — | — | — | — | — | — | — | — |
| | G-12 | — | — | — | — | — | — | — | — | — |
| | G-13 | — | — | — | — | — | — | — | — | — |
| | G-14 | — | — | — | — | — | — | — | — | — |
| | G-15 | — | — | — | — | — | — | — | — | — |
| | G-16 | — | — | — | — | — | — | — | — | — |
| Mold release agent | R-1 | 1 | 1 | 1 | 1 | 1 | 1 | 1 | 1 | — |
| | R-2 | — | — | — | — | — | — | — | — | 1 |
| | R-3 | — | — | — | — | — | — | — | — | — |
| | R-4 | — | — | — | — | — | — | — | — | — |
| | R-5 | — | — | — | — | — | — | — | — | — |
| | MEGAFACE F-444 (manufactured by DIC Corporation) | — | — | — | — | — | — | — | — | — |
| | Capstone FS-3100 (manufactured by Dupont) | — | — | — | — | — | — | — | — | — |
| | R-6 | — | — | — | — | — | — | — | — | — |
| Solvent | PGMEA | — | — | — | — | — | — | — | — | — |
| | Total (part by mass) | 100 | 100 | 100 | 100 | 100 | 100 | 100 | 100 | 100 |
| Evaluation | Pattern roughness | A | D | A | C | A | B | B | B | A |
| | Repetitive imprint suitability | A | D | C | B | A | B | B | B | A |
| | Robustness with respect to exposure amount | A | D | C | B | A | A | C | B | B |
| | Adhesiveness | A | D | A | A | B | B | B | A | A |

TABLE 2

| | | | Example 9 | Example 10 | Example 11 | Example 12 | Example 13 | Example 14 | Example 15 | Example 16 | Example 17 |
|---|---|---|---|---|---|---|---|---|---|---|---|
| Composition | Polymerizable compound | M-1 | 60 | 60 | 60 | 60 | 60 | 55 | 50 | — | 30 |
| | | M-2 | — | — | — | — | — | — | 14 | 50 | 30 |
| | | M-3 | — | — | — | — | — | — | — | — | — |
| | | M-4 | — | — | — | — | — | — | — | — | — |
| | | M-5 | — | — | — | — | — | — | — | — | — |
| | | M-6 | — | — | — | — | — | — | — | — | — |
| | | M-7 | — | — | — | — | — | — | — | — | 14 |
| | | M-8 | — | — | — | — | — | — | — | — | — |
| | | M-9 | — | — | — | — | — | — | — | — | — |
| | | M-10 | — | — | — | — | — | — | — | — | — |
| | | M-11 | — | — | — | — | — | — | — | — | — |
| | | M-12 | — | — | — | — | — | — | — | — | — |
| | | M-13 | — | — | — | — | — | — | 20 | 10 | 10 |
| | | M-14 | — | — | — | — | — | — | — | — | — |
| | | M-15 | 35 | 35 | 35 | 35 | 35 | 25 | — | 34 | 10 |
| | | M-16 | — | — | — | — | — | 15 | — | — | — |
| | | M-17 | — | — | — | — | — | — | 10 | — | — |
| | | Silicone polymer 1 | — | — | — | — | — | — | — | — | — |

TABLE 2-continued

| | | Example 9 | Example 10 | Example 11 | Example 12 | Example 13 | Example 14 | Example 15 | Example 16 | Example 17 |
|---|---|---|---|---|---|---|---|---|---|---|
| Polymerization initiator | Omnirad TPO H | 2 | — | — | — | — | 1.9 | 1.9 | 1.9 | 1.9 |
| | Omnirad 819 | — | 2 | — | — | — | — | — | — | — |
| | I-1 | — | — | 2 | — | — | — | — | — | — |
| | I-2 | — | — | — | 2 | 1.4 | — | — | — | — |
| | Irgacure OXE02 | — | — | 1.9 | — | 1.4 | — | — | — | — |
| | Omnirad 1173 | 1.9 | 0.95 | — | — | — | 1.9 | 1.9 | 1.9 | 1.9 |
| | Omnirad 2959 | — | 0.95 | — | — | 0.6 | — | — | — | — |
| | Omnirad MBF | — | — | — | 1.9 | 0.5 | — | — | — | — |
| Specific compound | G-1 | 0.1 | 0.05 | 0.1 | 0.1 | 0.1 | — | — | — | — |
| | H-1 | — | — | — | — | — | — | — | — | — |
| | G-2 | — | — | — | — | — | — | — | — | — |
| | G-3 | — | — | — | — | — | — | — | — | — |
| | G-4 | — | — | — | — | — | — | — | — | — |
| | G-5 | — | — | — | — | — | — | — | — | — |
| | G-6 | — | — | — | — | — | — | — | — | — |
| | G-7 | — | 0.05 | — | — | — | — | — | — | — |
| | G-8 | — | — | — | — | — | 0.2 | — | — | — |
| | G-9 | — | — | — | — | — | — | 0.2 | — | — |
| | G-10 | — | — | — | — | — | — | — | 0.2 | — |
| | G-11 | — | — | — | — | — | — | — | — | 0.2 |
| | G-12 | — | — | — | — | — | — | — | — | — |
| | G-13 | — | — | — | — | — | — | — | — | — |
| | G-14 | — | — | — | — | — | — | — | — | — |
| | G-15 | — | — | — | — | — | — | — | — | — |
| | G-16 | — | — | — | — | — | — | — | — | — |
| Mold release agent | R-1 | — | — | — | — | — | — | 2 | 1 | 1 |
| | R-2 | — | — | — | — | — | — | — | — | — |
| | R-3 | 1 | — | — | — | — | — | — | — | — |
| | R-4 | — | 1 | — | — | — | — | — | — | — |
| | R-5 | — | — | 1 | — | — | — | — | — | 1 |
| | MEGAFACE F-444 (manufactured by DIC Corporation) | — | — | — | 1 | — | — | — | 1 | — |
| | Capstone FS-3100 (manufactured by Dupont) | — | — | — | — | 1 | — | — | — | — |
| | R-6 | — | — | — | — | — | 1 | — | — | — |
| Solvent | PGMEA | — | — | — | — | — | — | — | — | — |
| | Total (part by mass) | 100 | 100 | 100 | 100 | 100 | 100 | 100 | 100 | 100 |
| Evaluation | Pattern roughness | A | A | A | A | A | A | A | A | A |
| | Repetitive imprint suitability | A | A | A | A | A | A | A | A | A |
| | Robustness with respect to exposure amount | A | A | A | A | A | A | A | A | A |
| | Adhesiveness | A | A | A | A | A | A | A | A | A |

TABLE 3

| | | | Example 18 | Example 19 | Example 20 | Example 21 | Example 22 | Example 23 | Example 24 | Example 25 |
|---|---|---|---|---|---|---|---|---|---|---|
| Composition | Polymerizable compound | M-1 | — | — | — | — | 45 | — | 45 | 60 |
| | | M-2 | 47 | — | — | — | 10 | — | 10 | — |
| | | M-3 | — | 58 | — | — | — | — | — | — |
| | | M-4 | — | — | — | — | — | — | — | — |
| | | M-5 | — | — | 60 | 40 | — | 40 | — | — |
| | | M-6 | — | — | — | 30 | — | 30 | — | — |
| | | M-7 | — | — | — | — | 26.2 | — | 18.2 | — |
| | | M-8 | — | — | — | — | — | — | — | — |
| | | M-9 | — | 30 | 24 | — | — | — | — | — |
| | | M-10 | — | — | — | 20 | — | 20 | — | — |
| | | M-11 | — | — | — | — | — | — | — | — |
| | | M-12 | — | — | — | — | — | — | — | — |
| | | M-13 | 10 | — | 5 | — | 10 | — | 10 | — |
| | | M-14 | — | 5 | 5 | 3.199 | — | 3.1999 | — | — |
| | | M-15 | 37 | — | — | — | — | — | — | 35 |

TABLE 3-continued

| | | Example 18 | Example 19 | Example 20 | Example 21 | Example 22 | Example 23 | Example 24 | Example 25 |
|---|---|---|---|---|---|---|---|---|---|
| | M-16 | — | — | — | — | — | — | — | — |
| | M-17 | — | — | — | — | — | — | — | — |
| | Silicone polymer 1 | — | — | — | — | — | — | — | — |
| Polymerization initiator | Omnirad TPO H | 1.9 | 1.9 | — | 1.9 | 1.9 | 1.9 | 1.9 | 3.9 |
| | Omnirad 819 | — | — | — | — | — | — | — | — |
| | I-1 | — | — | — | — | — | — | — | — |
| | I-2 | — | — | — | — | — | — | — | — |
| | Irgacure OXE02 | — | — | — | — | — | — | — | — |
| | Omnirad 1173 | 1.9 | 1.9 | — | 1.9 | 1.9 | 1.9 | 1.9 | — |
| | Omnirad 2959 | — | — | — | — | — | — | — | — |
| | Omnirad MBF | — | — | — | — | — | — | — | — |
| Specific compound | G-1 | — | — | — | 0.001 | 2 | 0.0001 | 10 | — |
| | H-1 | — | — | — | — | — | — | — | — |
| | G-2 | — | — | — | — | — | — | — | — |
| | G-3 | — | — | — | — | — | — | — | — |
| | G-4 | — | — | — | — | — | — | — | — |
| | G-5 | — | — | — | — | — | — | — | — |
| | G-6 | — | — | — | — | — | — | — | — |
| | G-7 | — | — | — | — | — | — | — | — |
| | G-8 | — | — | — | — | — | — | — | — |
| | G-9 | — | — | — | — | — | — | — | — |
| | G-10 | — | — | — | — | — | — | — | — |
| | G-11 | — | — | — | — | — | — | — | — |
| | G-12 | 0.2 | — | — | — | — | — | — | — |
| | G-13 | — | 0.2 | — | — | — | — | — | — |
| | G-14 | — | — | 4 | — | — | — | — | — |
| | G-15 | — | — | — | — | — | — | — | 0.1 |
| | G-16 | — | — | — | — | — | — | — | — |
| Mold release agent | R-1 | — | — | — | 3 | 3 | 3 | 3 | 1 |
| | R-2 | — | — | — | — | — | — | — | — |
| | R-3 | — | — | — | — | — | — | — | — |
| | R-4 | — | — | — | — | — | — | — | — |
| | R-5 | 2 | 3 | — | — | — | — | — | — |
| | MEGAFACE F-444 (manufactured by DIC Corporation) | — | — | 1 | — | — | — | — | — |
| | Capstone FS-3100 (manufactured by Dupont) | — | — | 1 | — | — | — | — | — |
| | R-6 | — | — | — | — | — | — | — | — |
| Solvent | PGMEA | — | — | — | — | — | — | — | — |
| | Total (part by mass) | 100 | 100 | 100 | 100 | 100 | 100 | 100 | 100 |
| Evaluation | Pattern roughness | A | A | A | A | A | A | A | A |
| | Repetitive imprint suitability | A | A | A | A | A | A | A | A |
| | Robustness with respect to exposure amount | A | A | A | A | A | A | B | A |
| | Adhesiveness | A | A | A | A | A | B | A | A |

TABLE 4

| | | | Example 26 | Example 27 | Example 28 | Example 29 | Example 30 |
|---|---|---|---|---|---|---|---|
| Composition | Polymerizable compound | M-1 | 60 | — | — | — | — |
| | | M-2 | — | — | — | — | — |
| | | M-3 | — | — | — | — | — |
| | | M-4 | — | 4.56 | — | — | — |
| | | M-5 | — | — | — | — | — |
| | | M-6 | — | — | — | — | — |
| | | M-7 | — | — | — | — | — |
| | | M-8 | — | — | — | — | — |
| | | M-9 | — | — | — | — | — |
| | | M-10 | — | — | — | — | — |
| | | M-11 | — | — | — | 1.2 | — |
| | | M-12 | — | — | 9.12 | 1.536 | — |
| | | M-13 | — | — | — | — | — |

TABLE 4-continued

| | | Example 26 | Example 27 | Example 28 | Example 29 | Example 30 |
|---|---|---|---|---|---|---|
| | M-14 | — | — | — | — | — |
| | M-15 | 35 | — | — | — | — |
| | M-16 | — | — | — | — | — |
| | M-17 | — | — | — | — | — |
| | Silicone polymer 1 | — | — | — | — | 4.56 |
| Polymer-ization initiator | Omnirad TPO H | 3.9 | 0.095 | 0.19 | 0.057 | 0.095 |
| | Omnirad 819 | — | — | — | — | — |
| | I-1 | — | — | — | — | — |
| | I-2 | — | — | — | — | — |
| | Irgacure OXE02 | — | — | — | — | — |
| | Omnirad 1173 | — | 0.095 | 0.19 | 0.057 | 0.095 |
| | Omnirad 2959 | — | — | — | — | — |
| | Omnirad MBF | — | — | — | — | — |
| Specific compound | G-1 | — | 0.1 | 0.2 | 0.06 | 0.1 |
| | H-1 | — | — | — | — | — |
| | G-2 | — | — | — | — | — |
| | G-3 | — | — | — | — | — |
| | G-4 | — | — | — | — | — |
| | G-5 | — | — | — | — | — |
| | G-6 | — | — | — | — | — |
| | G-7 | — | — | — | — | — |
| | G-8 | — | — | — | — | — |
| | G-9 | — | — | — | — | — |
| | G-10 | — | — | — | — | — |
| | G-11 | — | — | — | — | — |
| | G-12 | — | — | — | — | — |
| | G-13 | — | — | — | — | — |
| | G-14 | — | — | — | — | — |
| | G-15 | — | | | | |
| | G-16 | 0.1 | | | | |
| Mold release agent | R-1 | 1 | 0.15 | 0.3 | 0.09 | 0.15 |
| | R-2 | — | — | — | — | — |
| | R-3 | — | — | — | — | — |
| | R-4 | — | — | — | — | — |
| | R-5 | — | — | — | — | — |
| | MEGAFACE F-444 (manufactured by DIC Corporation) | — | — | — | — | — |
| | Capstone FS-3100 (manufactured by Dupont) | — | — | — | — | — |
| | R-6 | — | — | — | — | — |
| Solvent | PGMEA | — | 95 | 90 | 97 | 95 |
| | Total (part by mass) | 100 | 100 | 100 | 100 | 100 |
| Evaluation | Pattern roughness | A | A | A | A | A |
| | Repetitive imprint suitability | A | A | A | A | A |
| | Robustness with respect to exposure amount | A | A | A | A | A |
| | Adhesiveness | A | A | A | A | A |

Details of each of the components listed in the tables are as follows.
[Polymerizable Compound]
M-1 to M-17: compounds having the following structures; subscripts in parentheses indicate the number of repetitions in each structure
Silicone polymer 1: synthetic product shown below
M-1
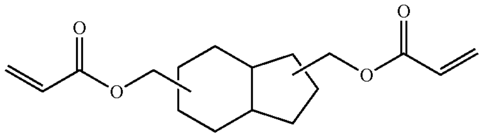
M-2
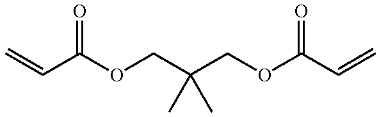
M-3
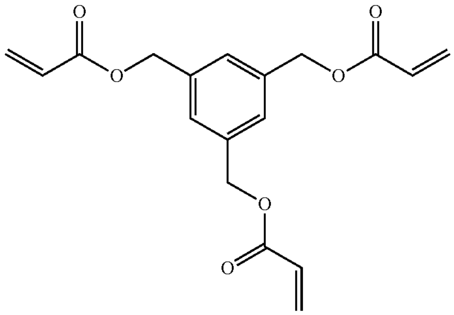
M-4
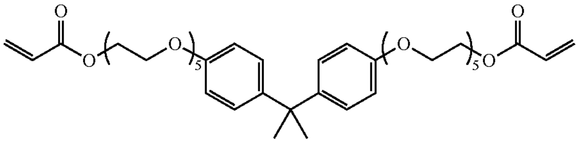
M-5
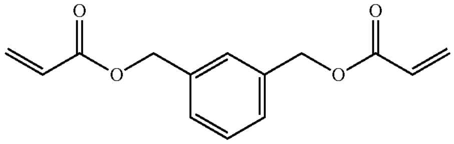
M-6
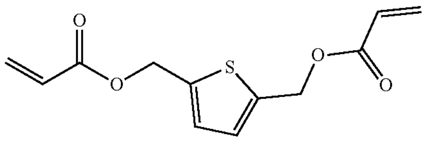
M-7
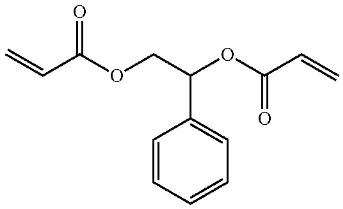
-continued
M-8
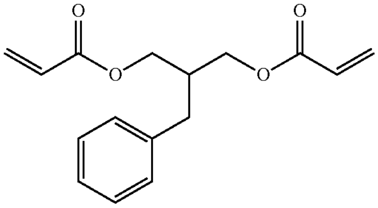
M-9
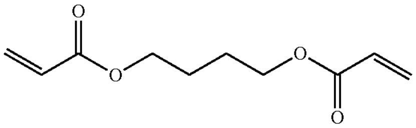
M-10
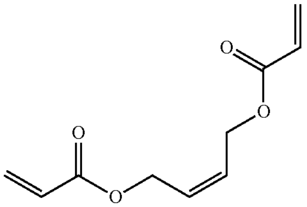
M-11
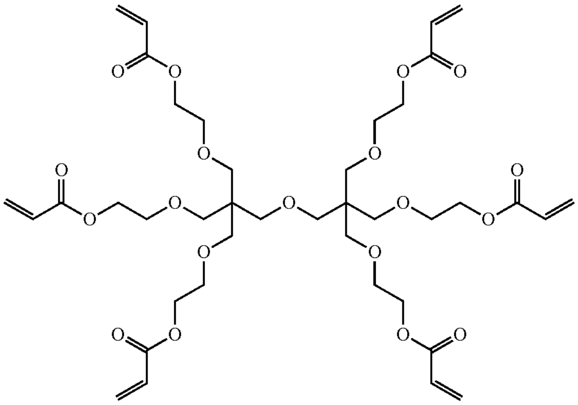
M-12
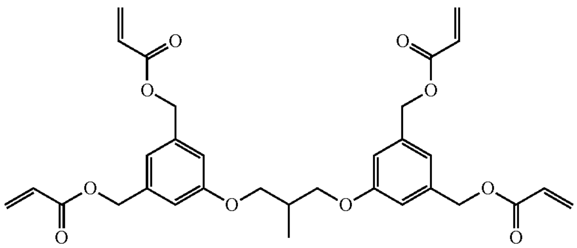
M-13
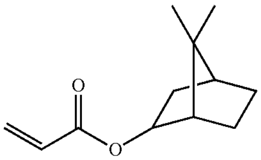
M-14
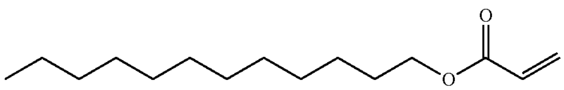

-continued

M-15

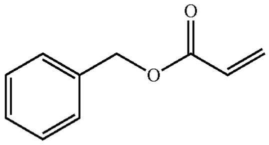

M-16

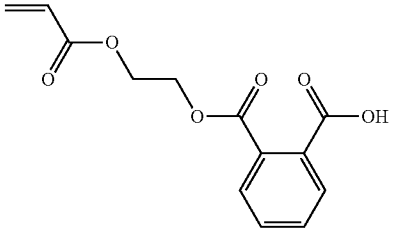

M-17

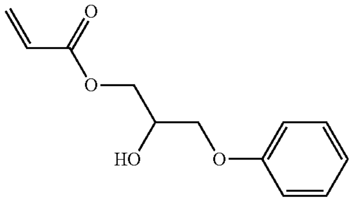

[Synthesis of Silicone Polymer 1]

A silicone resin X-40-9225 (trade name, manufactured by Shin-Etsu Chemical Co., Ltd.) (10 parts), 2-hydroxyethyl acrylate (58.1 parts), and paratoluene sulfonic acid monohydrate (0.034 parts) were mixed with each other, and then the mixture was heated at 120° C. and stirred for 3 hours while distilling off methanol produced by a condensation reaction to obtain 48 parts of a silicone polymer 1.

[Polymerization Initiator]

Omnirad TPO H (manufactured by IGM Resins B.V.)

Omnirad 819 (manufactured by IGM Resins B.V.)

I-1: compound having the following structure

I-2: compound having the following structure

Irgacure OXE 02 (manufactured by BASF SE)

Omnirad 1173 (manufactured by IGM Resins B.V.)

Omnirad 2959 (manufactured by IGM Resins B.V.)

Omnirad MBF (manufactured by IGM Resins B.V.)

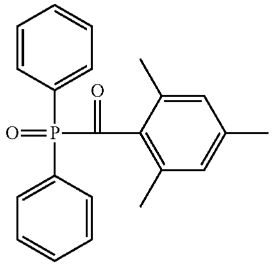

Omnirad TPO H

-continued

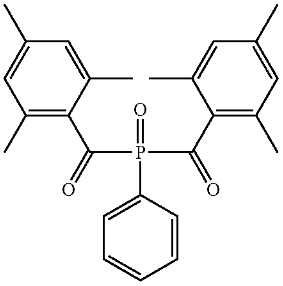

Omnirad 819

I-1

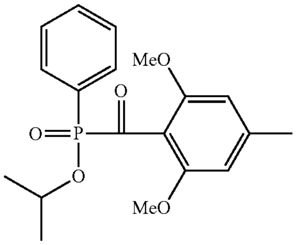

I-2

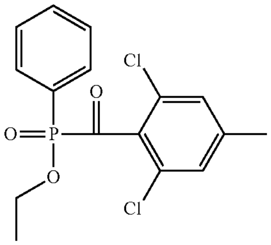

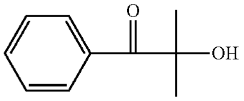

Omnirad 1173

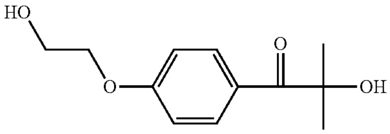

Omnirad 2959

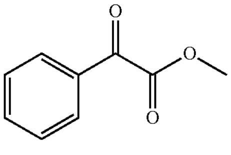

Omnirad MBF

-continued

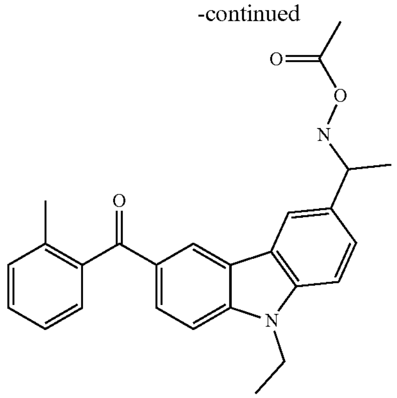

Irgacure OXE02

[Specific Compound]

G-1 to G-16: compounds having the following structures; G-1 to G-16 are compounds corresponding to the specific compound. Moreover, G-1 to G-13 are compounds having a sensitizing effect on the polymerization of the polymerizable compound, G-14 is a compound corresponding to a polymerization initiator having a sensitizing function, G-15 is a compound corresponding to a polymerizable compound having a sensitizing function, and G-16 is a compound which does not correspond to any of the compound, polymerization initiator, or polymerizable compound having the sensitizing effect.

H-1: compound having the following structure; H-1 is a compound which does not correspond to the specific compound.

G-1

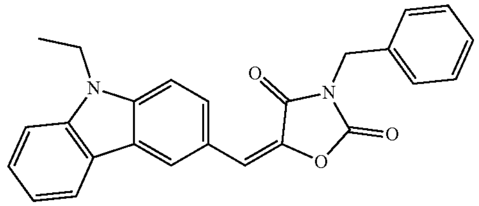

G-2

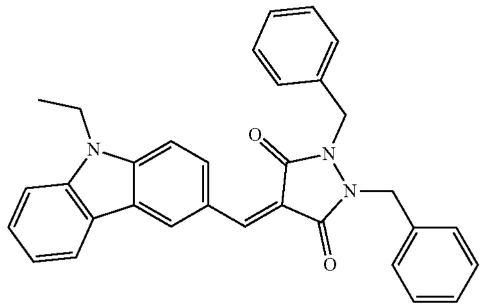

-continued

G-3

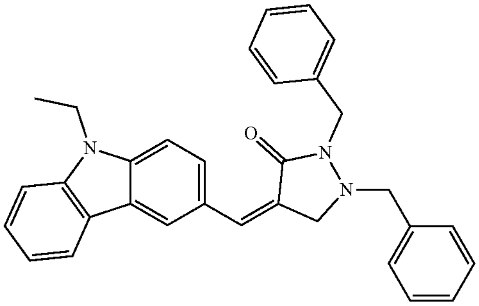

G-4

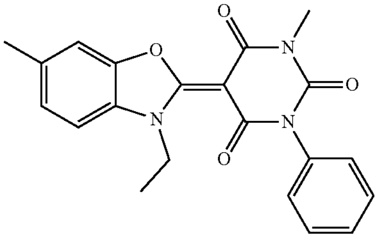

G-5

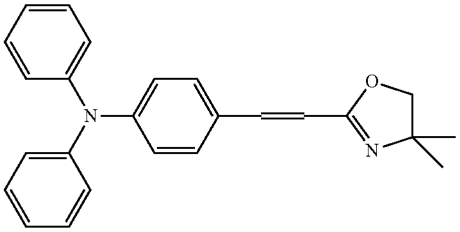

G-6

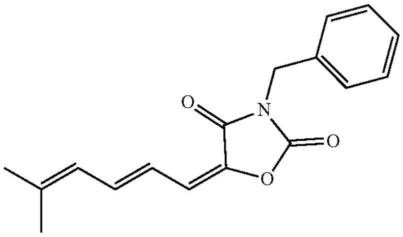

G-7

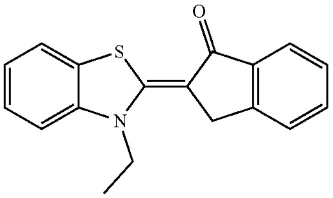

G-8

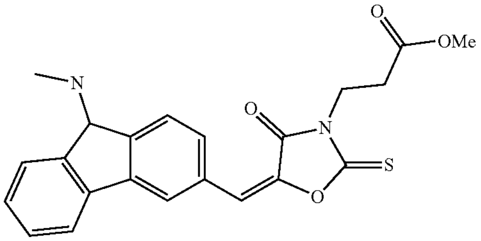

-continued
G-9
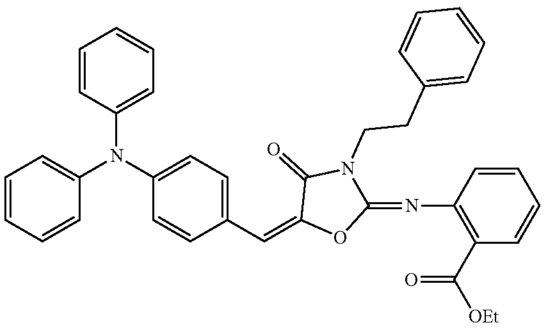
G-10
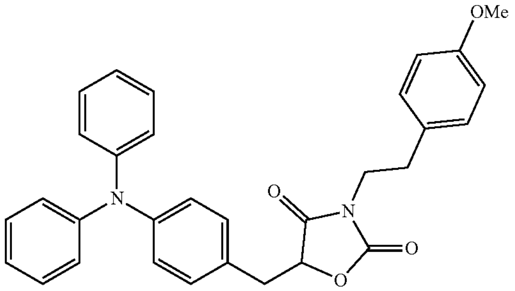
G-11
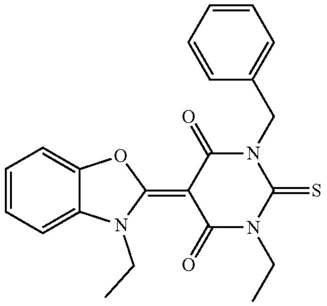
G-12
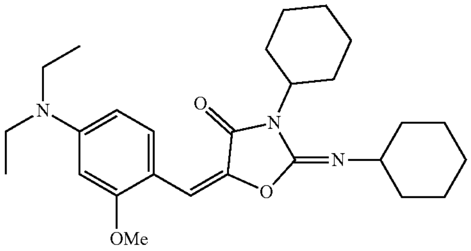
G-13
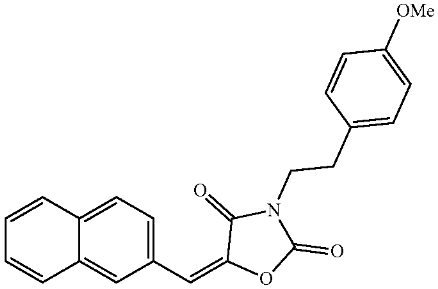
-continued
G-14
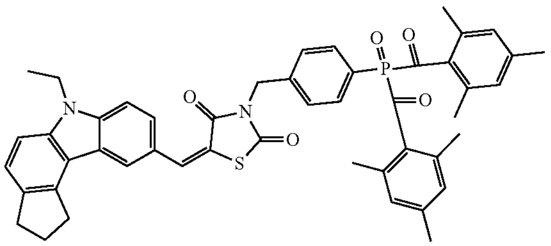
G-15
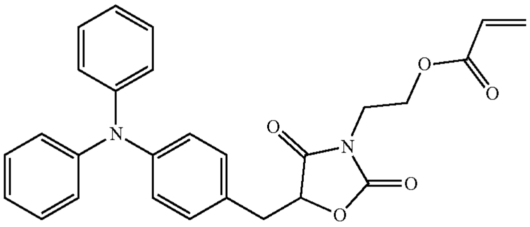
G-16
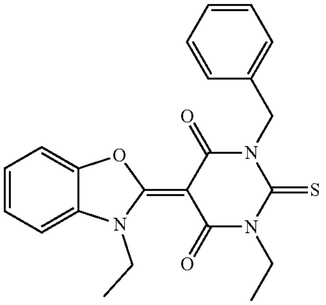
H-1
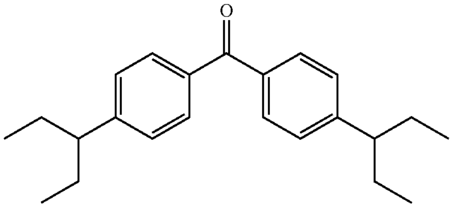
[Mold Release Agent]
R-1 to R-6: compounds having the following structures; in the following formulae, subscripts in parentheses indicate the number of repetitions
MEGAFACE F-444 (manufactured by DIC Corporation)
Capstone FS-3100 (manufactured by Dupont)
BLAUNON SR-730 (manufactured by AOKI OIL INDUSTRIAL Co., Ltd.)
R-1
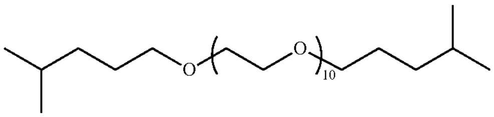
R-2
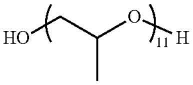

-continued

R-3

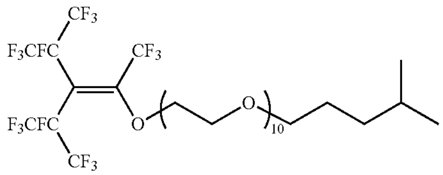

R-4

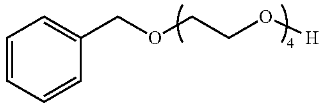

R-5

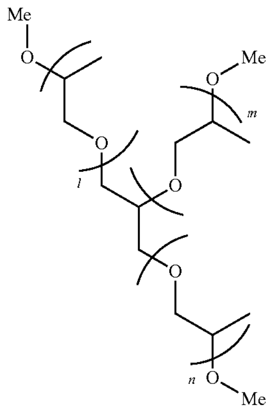

R-6

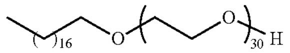

[Solvent]

PGMEA: propylene glycol monomethyl ether acetate (Evaluation)

<Evaluation of Pattern Roughness>

In each of Examples and Comparative Examples, a composition for forming a closely adhesive layer, described in Example 6 of JP2014-024322A, was spin-coated on a silicon wafer, and heated for 1 minute using a hot plate at 250° C. to form an underlayer film (closely adhesive layer) having a thickness of 5 nm.

Thereafter, the curable composition for imprinting or the comparative composition in each Example was applied onto the above-described closely adhesive layer using an ink jet device (Ink jet printer DMP-2831 manufactured by FUJIFILM Dimatix, Inc.) in Examples 1 to 26 and Comparative Example 1 and by a spin coating method in Examples 27 to 30, thereby forming a curable layer. The thickness of the curable layer was 50 nm. An ejected amount from the ink jet device was 1 pL per nozzle.

Thereafter, a mold for imprinting was pressed against the silicon wafer from the side of the above-described curable layer under a helium atmosphere. The used mold for imprinting was a quartz mold with line/space having a line width of 15 nm, a depth of 40 nm, and a pitch of 30 nm.

Thereafter, while the above-described mold for imprinting was pressed against the silicon wafer, exposure was performed from the side of the mold for imprinting through the mold for imprinting using an ultra-high pressure mercury lamp so that the exposure amount was 100 J/cm$^2$, and the mold was released to obtain a pattern consisting of the cured substance of the composition for forming a pattern.

A line width of the above-described pattern was confirmed at 100 points, a standard deviation a of the line width was calculated, and evaluation was performed from 3a (also referred to as "LWR") according to the following evaluation standard. The evaluation results are described in the column of "Pattern roughness" in the tables.

[Evaluation Standard]

A: LWR<1 nm

B: 1 nm≤LWR<4 nm

C: 4 nm≤LWR<8 nm

D: 8 nm≤LWR

<Evaluation of Repetitive Imprint Suitability>

Obtaining a pattern by the same method as in the evaluation of pattern roughness described above was repeated 50 times in succession. During the 50 repetitions, the same mold was used, and the mold was not washed during the repetition. The mold after the completion of 50 repetitions was observed and evaluated according to the following evaluation standard. The evaluation results are described in the column of "Repetitive imprint suitability" in the tables.

[Evaluation Standard]

A: mold defect rate<1%

B: 1%≤mold defect rate<5%

C: 5%≤mold defect rate<10%

D: 10%≤mold defect rate

<Evaluation of Robustness with Respect to Exposure Amount>

By the same method as the evaluation of pattern roughness described above, pattern formation was performed with an exposure amount of 80 mJ/cm$^2$ and an exposure amount of 120 mJ/cm$^2$ with the ultra-high pressure mercury lamp, and the smaller value of LWR (3σ) in the pattern formations was evaluated. As a result, a pattern consisting of the cured substance of the composition for forming a pattern was obtained. A line width of the above-described pattern was confirmed at 100 points, a standard deviation a of the line width was calculated, and evaluation was performed from 3σ (LWR) according to the following evaluation standard. The evaluation results are described in the column of "Robustness with respect to exposure amount" in the tables.

[Evaluation Standard]

A: LWR<1 nm

B: 1 nm≤LWR<4 nm

C: 4 nm≤LWR<8 nm

D: 8 nm≤LWR

<Evaluation of Adhesiveness>

A pattern was obtained by the same method as in the evaluation of pattern roughness described above. The obtained pattern was confirmed by scanning electron microscope observation (micro observation), and the presence or absence of pattern peeling was confirmed according to the following evaluation standard. The evaluation results are described in the column of "Adhesiveness" in the tables. It can be said that the adhesiveness is excellent as the pattern peeling is not observed.

[Evaluation Standard]

A: peeled area ratio<1%

B: 1%≤peeled area ratio<5%

C: 5%≤peeled area ratio<8%

D: 8%≤peeled area ratio

From the above-described results, it was found that, in a case where the curable composition for imprinting according to the embodiment of the present invention was used, the repetitive imprint suitability was excellent.

The composition according to Comparative Example 1 did not contain the specific compound. It was found that, in such an aspect, the repetitive imprint suitability was deteriorated.

Moreover, by the same method as in the evaluation of pattern roughness described above, the closely adhesive layer was formed on a silicon wafer using the composition for forming a closely adhesive layer, and a line & space structure, a contact hole structure, a dual damascene structure, and a staircase structure were formed on the closely adhesive layer of this silicon wafer with the closely adhesive layer using the curable composition for imprinting according to each Example. In addition, each silicon wafer was dry-etched by using this pattern as an etching mask, and each semiconductor element was manufactured using this silicon wafer. There was no problem with the performance of any of the semiconductor elements. Further, using the above-described composition for forming a closely adhesive layer and the curable composition for imprinting according to each Example, a semiconductor element was manufactured on a substrate having a spin-on carbon (SOC) layer by the same procedure as described above. There was no problem with the performance of this semiconductor element as well.

What is claimed is:

1. A curable composition for imprinting, comprising:

a polymerizable compound; and a polymerization initiator, wherein one of components contained in the composition is a compound which includes a 5-membered ring structure having two or more heteroatoms as ring members, said compound being represented by Formula (1), (1)

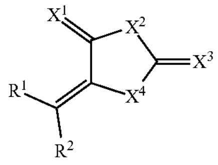

in Formula (1), $X^1$ to $X^4$ each independently represent O, S, or $NR^N$, $R^N$ represents a hydrogen atom or an organic group, and $R^1$ and $R^2$ each independently represent a hydrogen atom or an organic group, where $R^1$ and $R^2$ may be bonded to each other to form a ring.

2. The curable composition for imprinting according to claim 1, wherein all carbon atoms included in the 5-membered ring structure as ring members are $sp^2$ carbon atoms.

3. The curable composition for imprinting according to claim 1, wherein the compound which includes a 5-membered ring structure having two or more heteroatoms as ring members is a compound having an aromatic organic group.

4. The curable composition for imprinting according to claim 1, wherein, in Formula (1), $X^1$ is O and $X^2$ is $NR^N$.

5. The curable composition for imprinting according to claim 1, wherein at least one of $R^1$ or $R^2$ in Formula (1) is an aromatic organic group.

6. The curable composition for imprinting according to claim 1, wherein the compound which includes a 5-membered ring structure having two or more heteroatoms as ring members is a compound represented by Formula (2), (2)

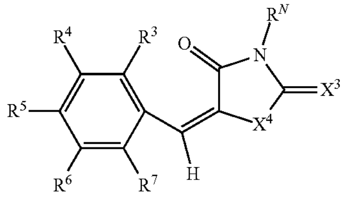

in Formula (2), $X^3$ and $X^4$ each independently represent O, S, or $NR^N$, $R^N$ represents a hydrogen atom or an organic group, and $R^3$ to $R^7$ each independently represent a hydrogen atom or an organic group, where $R^3$ to $R^7$ may be bonded to each other to form a ring.

7. The curable composition for imprinting according to claim 1, wherein the polymerization initiator is a polymerization initiator having an acylphosphine oxide group in a molecule.

8. The curable composition for imprinting according to claim 1, further comprising:

a mold release agent.

9. A cured substance obtained by curing the curable composition for imprinting according to claim 1.

10. An imprint pattern producing method comprising:

an applying step of applying the curable composition for imprinting according to claim 1 onto a member to be applied, which is selected from the group consisting of a support and a mold;

a contact step of contacting a member which is not selected as the member to be applied from the group consisting of the support and the mold with the curable composition for imprinting as a contact member;

a curing step of forming the curable composition for imprinting into a cured substance; and a peeling step of peeling off the mold from the cured substance.

11. The imprint pattern producing method according to claim 10, wherein the support is a member including a closely adhesive layer on a surface on a side to which the curable composition for imprinting is applied.

12. A method for manufacturing a device, comprising:

the imprint pattern producing method according to claim 10.

* * * * *